(12) United States Patent
Haga et al.

(10) Patent No.: US 9,933,180 B2
(45) Date of Patent: Apr. 3, 2018

(54) DATA PROVISION METHOD USING AIR CONDITIONER LOG INFORMATION

(71) Applicant: Panasonic Intellectual Property Corporation of America, Torrance, CA (US)

(72) Inventors: Tomoyuki Haga, Nara (JP); Motoji Ohmori, Osaka (JP); Natsume Matsuzaki, Osaka (JP); Yuichi Futa, Ishikawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 287 days.

(21) Appl. No.: 14/780,128

(22) PCT Filed: Apr. 11, 2014

(86) PCT No.: PCT/JP2014/002082
§ 371 (c)(1),
(2) Date: Sep. 25, 2015

(87) PCT Pub. No.: WO2014/171118
PCT Pub. Date: Oct. 23, 2014

(65) Prior Publication Data
US 2016/0047566 A1    Feb. 18, 2016

Related U.S. Application Data

(60) Provisional application No. 61/813,364, filed on Apr. 18, 2013.

(30) Foreign Application Priority Data

Jun. 28, 2013  (JP) .................................. 2013-136004

(51) Int. Cl.
*G06F 11/30* (2006.01)
*F24F 11/00* (2018.01)
(Continued)

(52) U.S. Cl.
CPC ........ *F24F 11/006* (2013.01); *F24F 11/0012* (2013.01); *F24F 11/0086* (2013.01);
(Continued)

(58) Field of Classification Search
CPC ................. F24F 11/006; F24F 11/0086; F24F 2011/0091
(Continued)

(56) References Cited

U.S. PATENT DOCUMENTS 9,441,991 B2 * 9/2016 Haga ....................... H04L 12/28
2002/0128728 A1   9/2002 Murakami et al.
(Continued)

FOREIGN PATENT DOCUMENTS

JP   2002-342185 A   11/2002
JP   2003-111170 A    4/2003
(Continued)

OTHER PUBLICATIONS

International Search Report for corresponding International Application No. PCT/JP2014/002082 dated Jul. 8, 2014
(Continued)

*Primary Examiner* — Anthony Ho
(74) *Attorney, Agent, or Firm* — Renner Otto Boisselle & Sklar, LLP

(57) ABSTRACT

A data providing method is carried out by a computer (460) built in a data processing system (1) which is designed to collect log information from electronic devices through a network (30) and provide services based on that log information for authenticated users. The data providing method includes: receiving an air conditioner (102a, 102b)'s log
(Continued)

information through the network; generating display data by reference to pieces of information which are included in the air conditioner's log information and which indicate (i) a preset temperature of the air conditioner, (ii) an outdoor temperature outside a living space in which the air conditioner is installed, and (iii) an indoor temperature of the living space in which the air conditioner is installed, the display data representing a trend of change of a turnaround time that indicates how long it takes from when the air conditioner starts operating until the indoor temperature reaches the preset temperature; and providing the display data for an authenticated user's display terminal (130*a*, 130*b*).

20 Claims, 19 Drawing Sheets

(51) Int. Cl.
*G06Q 50/00* (2012.01)
*H04Q 9/00* (2006.01)
*H04L 12/28* (2006.01)
*H04L 29/08* (2006.01)

(52) U.S. Cl.
CPC ............. *G06Q 50/00* (2013.01); *H04L 12/28* (2013.01); *H04L 67/12* (2013.01); *H04L 67/16* (2013.01); *H04Q 9/00* (2013.01); *F24F 2011/0013* (2013.01); *F24F 2011/0052* (2013.01); *F24F 2011/0063* (2013.01); *F24F 2011/0068* (2013.01); *F24F 2011/0073* (2013.01); *F24F 2011/0091* (2013.01); *F24F 2011/0093* (2013.01)

(58) Field of Classification Search
USPC .......................................................... 702/184
See application file for complete search history.

(56) References Cited

U.S. PATENT DOCUMENTS

| 2006/0047382 A1 | 3/2006 | Morioka et al. |
| 2014/0227975 A1 | 8/2014 | Kuroyama et al. |

FOREIGN PATENT DOCUMENTS

| JP | 2004-192252 A | 7/2004 |
| JP | 2006-053016 A | 2/2006 |
| JP | 2007-278618 A | 10/2007 |
| JP | 4206953 B2 | 1/2009 |
| JP | 2009-212699 A | 9/2009 |
| JP | 2010-198362 A | 9/2010 |
| JP | 4559195 B2 | 10/2010 |
| WO | WO 2013/035213 A1 | 3/2013 |
| WO | WO 2013/047125 A1 | 4/2013 |

OTHER PUBLICATIONS

Copending U.S. Appl. No. 14/405,999, filed Dec. 5, 2014 (copy of application provided).

* cited by examiner

FIG.11

| | PRODUCT TYPE ID | LOT # | CONDITION | RESULT/TREND |
|---|---|---|---|---|
| R1 | ABC-123 | AA1 | ① IF COMPRESSOR HAS OPERATED FOR 10 YEARS OR MORE IN TOTAL AT 2000 rpm; AND ② IF COOLING FUNCTION HAS DECLINED THREEFOLD COMPARED TO WHEN IT WAS PURCHASED | THE COMPRESSOR WENT OUT OF ORDER IN 100 CASES. |
| R2 | ABC-123 | AA2 | ① IF COMPRESSOR HAS OPERATED FOR 15 YEARS OR MORE IN TOTAL AT 2000 rpm; AND ② IF HEATING FUNCTION HAS DECLINED FIVEFOLD COMPARED TO WHEN IT WAS PURCHASED | THE COMPRESSOR WENT OUT OF ORDER IN 300 CASES. |
| R3 | ABC-123 | AA2 | ①IF POWER CONSUMPTION HAS INCREASED ONE-AND-A-HALF TIMES COMPARED TO WHEN IT WAS PURCHASED | THE FILTER IS DIRTY. |
| R4 | ABC-456 | BB1 | ① IF NO CLEANING HAS BEEN DONE FOR THREE MONTHS OR MORE, AND ② IF COOLING FUNCTION HAS DECLINED TWOFOLD OR MORE COMPARED TO WHEN IT WAS PURCHASED | POWER CONSUMPTION INCREASED BY 20% COMPARED TO WHEN THE FILTER WAS CLEAN |

DATA PROVISION METHOD USING AIR CONDITIONER LOG INFORMATION

TECHNICAL FIELD

The present disclosure provides a data providing method for use in a data processing system which is designed to provide services by using log information collected from a user's own air conditioner.

BACKGROUND ART

People have studied systems for collecting log information from a consumer electronic device in a general household and providing services by reference to the log information thus collected. For example, Patent Document No. 1 mentions a system for aiding a consumer in maintaining his or her consumer electronic device, and Patent Document No. 2 mentions a system for estimating the degree of decline in an air conditioner's performance.

CITATION LIST

Patent Literature

Patent Document No. 1: Japanese Patent No. 4559195
Patent Document No. 2: Japanese Patent No. 4206953

SUMMARY OF INVENTION

Technical Problem

However, such systems have not been realized yet and future studies and further improvements are needed to put those systems into practical use.

A non-limiting exemplary embodiment of the present application provides a data providing method which uses log information collected from an electronic device.

Solution to Problem

An exemplary data providing method to overcome the problem described above is carried out by a computer built in a data processing system which is designed to collect log information from electronic devices through a network and provide services based on that log information for authenticated users, the data providing method including: receiving an air conditioner's log information through the network; generating display data by reference to pieces of information which are included in the air conditioner's log information and which indicate (i) a preset temperature of the air conditioner, (ii) an outdoor temperature outside a living space in which the air conditioner is installed, and (iii) an indoor temperature of the living space in which the air conditioner is installed, the display data representing a trend of change of a turnaround time that indicates how long it takes from when the air conditioner starts operating until the indoor temperature reaches the preset temperature; and providing the display data for an authenticated user's display terminal.

This general and particular aspect can be implemented as a system, a method or a computer program or a combination thereof.

Advantageous Effects of Invention

A data providing method according to an aspect of the present invention contributes to realizing further improvement which needs to get done to put a data processing system into practical use.

BRIEF DESCRIPTION OF DRAWINGS

FIG. 11 Shows an exemplary configuration for a DB which stores the results of analysis that has been made based on the operation logs collected by the server from the air conditioner 102$a$ in the exemplary embodiment.

DESCRIPTION OF EMBODIMENTS

Figure 1:
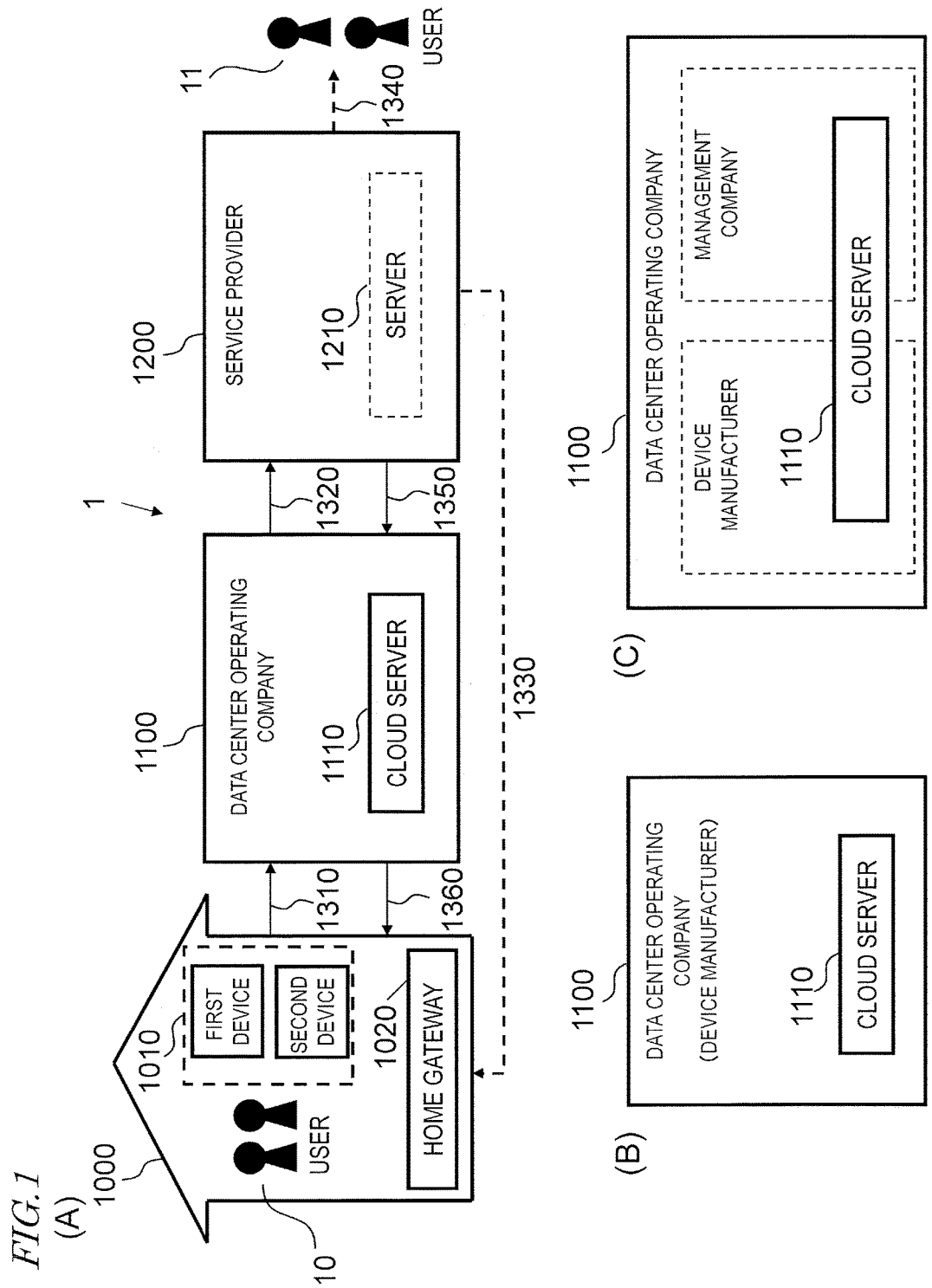
FIG. 1 (A) outlines the service provided by a system according to an exemplary embodiment, (B) illustrates an example in which a device manufacturer functions as a data center operating company, and (C) illustrates an example in which both or one of a device manufacturer and a management company functions as a data center operating company.

First of all, the findings that form the basis of the present disclosure will be described.

The system for aiding a consumer in maintaining his or her electronic device as disclosed in Patent Document No. 1 collects supply voltage and drying time data as data that needs to be used to do maintenance in cases of a washing machine's failure or defects by connecting a personal computer to the washing machine.

The system for estimating the degree of decline in an air conditioner's performance as disclosed in Patent Document No. 2 estimates the degree of decline in the air conditioner's performance by comparing information about the equipment for one year after its installment (including indoor temperature, outdoor temperature, preset temperature and power consumption) to information about that equipment at the same time of each year under the same load condition.

According to the technique disclosed in Patent Document No. 1, data is saved using a memory which is built in the washing machine. That is why the size of the data that can be saved in the memory is constrained by the capacity of that memory, and therefore, the contents of the data saved are also subject to some constraints.

For example, according to the technique disclosed in Patent Document No. 1, the contents of the data saved in the memory are limited to the settings selected by the user and data about the previous maintenance and the maintenance before the previous one. Such contents are too limited to be used as check items to do maintenance. Also, the types and contents of such data saved in the memory are determined on the supposition that the data will be used only by a maintenance person who does maintenance on the washing machine. For example, data about the supply voltage and drying time of the washing machine are saved there. Under circumstances such as these, the user cannot get data about the washing machine and check out the condition of the washing machine by him- or herself.

According to the technique disclosed in Patent Document No. 2, on the other hand, information about the equipment for one year after its installment is used as reference information to be compared to information about that equipment at the same time of each year under the same load condition. That is to say, according to the technique of Patent Document No. 2, information at a point in time during the initial stage is just compared to information at present. Thus, it is impossible to understand, only by reference to that information, what series of changes the target device has gone through from its initial stage through the present. For example, as for an air conditioner installed at an office building or a factory, an expert maintenance person is asked to do regular maintenance and check on it. Thus, he or she can still determine the equipment's condition by reference to that little information. As for a consumer electronic device for a general household, however, it is difficult for the user to determine exactly what the condition of the target device is just by reference to the difference between the information about the equipment for one year after its installment and the information about the same equipment for this year.

Meanwhile, people have studied methods for providing cloud services recently. As a part of their studies, someone proposed that log information indicating how an electronic device is used be collected by a cloud server from the electronic device and cloud services be provided by reference to that log information. However, such methods are still under study, and at present, there is no data providing system yet which provides cloud services by reference to electronic devices' log information.

Thus, in order to improve the functionality of such a data processing system that provides cloud services by reference to an electronic device's (such as an air conditioner's) log information, the present inventors propose the following improvements.

A data providing method according to an aspect of the present disclosure is carried out by a computer built in a data processing system which is designed to collect log information from electronic devices through a network and provide services based on that log information for authenticated users, the data providing method including: receiving an air conditioner's log information through the network; generating display data by reference to pieces of information which are included in the air conditioner's log information and which indicate (i) a preset temperature of the air conditioner, (ii) an outdoor temperature outside a living space in which the air conditioner is installed, and (iii) an indoor temperature of the living space in which the air conditioner is installed, the display data representing a trend of change of a turnaround time that indicates how long it takes from when the air conditioner starts operating until the indoor temperature reaches the preset temperature; and providing the display data for an authenticated user's display terminal.

In one embodiment, the display data represents the trend of change of the turnaround time using multiple sets of sample data, and the multiple sets of sample data are data based on the air conditioner's log information that have been gotten at multiple different points in time.

In one embodiment, the display data represents the trend of change of the turnaround time using at least three sets of sample data.

In one embodiment, the display data represents the trend of change of the turnaround time that indicates how long it takes from when the air conditioner starts operating until the indoor temperature reaches the preset temperature in a situation where the outdoor temperature and the indoor temperature maintain a constant relation.

In one embodiment, each of the multiple sets of sample data is a set of data which has been gotten at the same indoor temperature and at the same outdoor temperature and which is based on the air conditioner's log information.

In one embodiment, the air conditioner has a filter; and the multiple sets of sample data include information about cleaning history of the filter during a predetermined period of time before the start of operation of the air conditioner.

In one embodiment, the air conditioner has a filter; the display data represents the trend of change of the turnaround time, using sample data that are collected at three or more points in time representing the turnaround time that indicates how long it takes from when the air conditioner starts operating until the indoor temperature reaches the preset temperature of the air conditioner in a situation where the outdoor temperature and the indoor temperature maintain a constant relation; the display data includes information about cleaning history of the filter of the air conditioner during a predetermined period of time before the start of operation of the air conditioner wherein the information is associated with a power consumption at each of the three or more points in time; and for past points in time from among the three or more points in time, the information about cleaning history represents information when the filter cleaning was done, whereas for a current point in time from among the three or more points in time, the information about cleaning history represents whether the filter cleaning is required at the current point in time.

Another data providing method disclosed herein is a data providing method to be carried out by a computer built in a data processing system which is designed to collect log information from electronic devices through a network and provide services based on that log information for authenticated users, the data providing method including: receiving an air conditioner's log information through the network; generating display data by reference to pieces of information which are included in the air conditioner's log information and which indicate (i) a preset temperature of the air conditioner, (ii) an outdoor temperature outside a living space in which the air conditioner is installed, and (iii) an indoor temperature of the living space in which the air conditioner is installed, the display data representing a trend of change of a turnaround time that indicates how long it takes from when the air conditioner starts operating until the indoor temperature reaches the preset temperature; providing the display data for an authenticated user's display terminal; and if the turnaround time has exceeded a predetermined amount of time, further providing maintenance information about the air conditioner's maintenance for the display terminal.

In one embodiment, the display data represents the trend of change of the turnaround time that indicates how long it takes from when the air conditioner starts operating until the indoor temperature reaches the preset temperature in a situation where the outdoor temperature and the indoor temperature maintain a constant relation.

In one embodiment, the air conditioner has a filter; the display data includes information about cleaning history of the filter during a predetermined period of time before the start of operation of the air conditioner; and the maintenance information includes a message about the filter cleaning.

In one embodiment, the air conditioner has a filter; the display data includes information about cleaning history of the filter during a predetermined period of time before the start of operation of the air conditioner; and the maintenance information includes a message about the filter cleaning if the turnaround time has exceeded a predetermined amount of time and if the information about cleaning history indicates that the filter has not been cleaned for the predetermined period of time before the start of operation of the air conditioner.

In one embodiment, the air conditioner has a filter; the display data represents the trend of change of the turnaround time, using sample data that are collected at three or more points in time representing the turnaround time that indicates how long it takes from when the air conditioner starts operating until the indoor temperature reaches the preset temperature of the air conditioner in a situation where the outdoor temperature and the indoor temperature maintain a constant relation; the display data includes information about cleaning history of the filter of the air conditioner during a predetermined period of time before the start of operation of the air conditioner wherein the information is associated with a power consumption at each of the three or more points in time; for past points in time from among the three or more points in time, the information about cleaning history represents information when the filter cleaning was done, whereas for a current point in time from among the three or more points in time, the information about cleaning history represents whether the filter cleaning is required at the current point in time; and the maintenance information includes a message about the filter cleaning if the turnaround time has exceeded a predetermined amount of time and if the cleaning history indicates that the filter has not been cleaned for the predetermined period of time before the start of operation of the air conditioner.

In one embodiment, if the turnaround time is increasing compared to past history included in the air conditioner's log information and if the turnaround time has exceeded the predetermined amount of time, the maintenance information is further provided for the display terminal.

In one embodiment, the data providing method includes: finding at least one more air conditioner which has been manufactured in the same lot as the air conditioner by reference to a database in which information about air conditioners' defects is accumulated on a lot-by-lot basis; further spotting another air conditioner, in which the turnaround time exceeds the predetermined amount of time, from the at least one more air conditioner that has been found; and providing maintenance information associated with information about the defect of that another air conditioner that has been spotted.

Still another data providing method disclosed herein is a data providing method to be carried out by a computer built in a data processing system which is designed to collect log information from electronic devices through a network and provide services based on that log information for authenticated users, the data providing method including: receiving an air conditioner's log information through the network; generating display data by reference to pieces of information which are included in the air conditioner's log information and which indicate (i) a preset temperature of the air conditioner, (ii) an outdoor temperature outside a living space in which the air conditioner is installed, and (iii) an indoor temperature of the living space in which the air conditioner is installed, the display data representing a trend of change of the amount of power consumed before the indoor temperature reaches the preset temperature from when the air conditioner starts operating; and providing the display data for an authenticated user's display terminal.

In one embodiment, the display data represents the trend of change of the power consumption using multiple sets of sample data; and the multiple sets of sample data are data based on the air conditioner's log information that have been gotten at multiple different points in time.

In one embodiment, the display data represents the trend of change of the power consumption using at least three sets of sample data.

In one embodiment, the display data represents the trend of change of the amount of power consumed before the indoor temperature reaches the preset temperature from when the air conditioner starts operating in a situation where the outdoor temperature and the indoor temperature maintain a constant relation.

In one embodiment, each of the multiple sets of sample data is a set of data which has been gotten at the same indoor temperature and at the same outdoor temperature and which is based on the air conditioner's long information.

In one embodiment, the air conditioner has a filter; and the multiple sets of sample data include information about cleaning history of the filter during a predetermined period of time before the start of operation of the air conditioner wherein the information is associated with the power consumption.

In one embodiment, the air conditioner has a filter; the display data represents the trend of change of the turnaround time, using sample data that are collected at three or more points in time representing the turnaround time that indicates how long it takes from when the air conditioner starts operating until the indoor temperature reaches the preset temperature of the air conditioner in a situation where the outdoor temperature and the indoor temperature maintain a constant relation; the display data includes information about cleaning history of the filter of the air conditioner during a predetermined period of time before the start of operation of the air conditioner wherein the information is associated with a power consumption at each of the three or more points in time; and for past points in time from among the three or more points in time, the information about cleaning history represents information when the filter cleaning was done, whereas for a current point in time from among the three or more points in time, the information about cleaning history represents whether the filter cleaning is required at the current point in time.

Yet another data providing method disclosed herein is a data providing method in a system which is designed to collect log information from electronic devices through a network and provide services based on that log information for authenticated users, the data providing method including: receiving an air conditioner's log information through the network; generating display data by reference to pieces of information which are included in the air conditioner's log information and which indicate (i) a preset temperature of the air conditioner, (ii) an outdoor temperature outside a living space in which the air conditioner is installed, and (iii) an indoor temperature of the living space in which the air conditioner is installed, the display data representing a trend of change of the amount of power consumed before the indoor temperature reaches the preset temperature from when the air conditioner starts operating; providing the display data for an authenticated user's display terminal; and if the power consumption has exceeded a predetermined value, further providing maintenance information about the air conditioner's maintenance for the display terminal.

In one embodiment, the display data represents the trend of change of the turnaround time that indicates how long it takes from when the air conditioner starts operating until the indoor temperature reaches the preset temperature in a situation where the outdoor temperature and the indoor temperature maintain a constant relation.

In one embodiment, the air conditioner has a filter; the display data includes information about cleaning history of the filter during a predetermined period of time before the start of operation of the air conditioner wherein the information is associated with the power consumption; and the maintenance information includes a message about the filter cleaning.

In one embodiment, the air conditioner has a filter; the display data includes information about cleaning history of the filter during a predetermined period of time before the start of operation of the air conditioner wherein the information is associated with the power consumption; and the maintenance information includes a message about the filter cleaning if the turnaround time has exceeded a predetermined amount of time and if the information about cleaning history indicates that the filter has not been cleaned for the predetermined period of time before the start of operation of the air conditioner.

In one embodiment, the air conditioner has a filter; the display data represents the trend of change of the turnaround time, using sample data that are collected at three or more points in time representing the turnaround time that indicates how long it takes from when the air conditioner starts operating until the indoor temperature reaches the preset temperature of the air conditioner in a situation where the outdoor temperature and the indoor temperature maintain a constant relation; the display data includes information about cleaning history of the filter of the air conditioner during a predetermined period of time before the start of operation of the air conditioner wherein the information is associated with a power consumption at each of the three or more points in time; for past points in time from among the three or more points in time, the information about cleaning history represents information when the filter cleaning was done, whereas for a current point in time from among the three or more points in time, the information about cleaning history represents whether the filter cleaning is required at the current point in time; and the maintenance information includes a message about the filter cleaning if the turnaround time has exceeded a predetermined amount of time and if the information about cleaning history indicates that the filter has not been cleaned for the predetermined period of time before the start of a current operation of the air conditioner.

In one embodiment, if the turnaround time is increasing compared to past history included in the air conditioner's log information and if the turnaround time has exceeded the predetermined amount of time, the maintenance information is further provided for the display terminal.

In one embodiment, the data providing method includes: finding at least one more air conditioner which has been manufactured in the same lot as the air conditioner by reference to a database in which information about air conditioners' defects is accumulated on a lot-by-lot basis; further spotting another air conditioner, in which the turnaround time exceeds the predetermined amount of time, from the at least one more air conditioner that has been found; and providing maintenance information associated with information about the defect of that another air conditioner that has been spotted.

Still another data providing method disclosed herein is a data providing method to be carried out by a computer built in a data providing system which is designed to collect log information from electronic devices through a network and provide services based on that log information for authenticated users, the data providing method including: receiving an air conditioner's log information through the network; generating display data by reference to pieces of information which are included in the air conditioner's log information and which indicate (i) a preset temperature of the air conditioner, (ii) an outdoor temperature outside a living space in which the air conditioner is installed, and (iii) an indoor temperature of the living space in which the air conditioner is installed, the display data representing a trend of change of a turnaround time that indicates how long it takes from when the air conditioner starts operating until the indoor temperature reaches the preset temperature, wherein the display data is at least one of image data and sound data; and providing the display data for an authenticated user's display terminal.

In one embodiment, the display data represents the trend of change of the turnaround time that indicates how long it takes from when the air conditioner starts operating until the indoor temperature reaches the preset temperature in a situation where the outdoor temperature and the indoor temperature maintain a constant relation.

In one embodiment, the data representing the trend of change of the turnaround time is at least one of image data and sound data.

In one embodiment, the indoor temperature is the temperature of a living space in which the indoor unit of the air conditioner is installed, and the outdoor temperature is the ambient air temperature around the outdoor unit of the air conditioner.

In one embodiment, the data providing method includes generating, if the air conditioner's log information has been detected under a predefined abnormal condition, notification data and providing the notification data for a preregistered display terminal.

In one embodiment, the data providing method includes: finding at least one more air conditioner which has been manufactured in the same lot as the air conditioner by reference to a database in which information about air conditioners' defects is accumulated on a lot-by-lot basis; further spotting another air conditioner, in which the turnaround time exceeds the predetermined amount of time, from the at least one more air conditioner that has been found; and providing at least one of maintenance information associated with information about the defect of that another air conditioner that has been spotted and information about a new air conditioner.

Embodiments of a data providing method according to the present invention to be carried out in a data processing system will now be described with reference to the accompanying drawings.

Each of the embodiments to be described below shows a specific example of the present disclosure. The numerical values, shapes, components, steps and order of steps to be adopted in those embodiments are just examples and are never intended to limit the scope of the technique of the present disclosure. Also, among the components to be mentioned in the following description of embodiments, components which are not described in any independent claim at the time of filing of the present application will be described as arbitrary components. Furthermore, what will be described herein as embodiments of the present disclosure may be used in any arbitrary combination.

1. Outline of Services Provided

First of all, the services provided by a service providing system according to an embodiment of the present disclosure will be described. In this description, the "service providing system" will be sometimes hereinafter referred to as a "data processing system".

In this description, the terms are defined as follows.

Electronic device refers herein to a device which uses electric power for its heat source, light source or power source.

Examples of electronic devices: in this description, a typical example of the electronic device is an air conditioner.

Air conditioner refers to an electronic device for adjusting the temperature inside a room or inside a building at least. An air conditioner typically has a plurality of units including an indoor unit and an outdoor unit. The "air conditioner" refers herein to a device with only a cooling function, a device with only a heating function, or a device with both of these functions among various consumer electronic devices. In the following description of embodiments, the air conditioner is supposed to be a device with both the cooling function and the heating function for the sake of convenience. However, this is only an example, and the air conditioner may also be a device with only the cooling function or a device with only the heating function. Examples of air conditioners to which the present disclosure is supposed to be applied include air conditioners to be installed in a general household, air conditioners to be used for business (such as an air conditioner to be installed in a hotel or an air conditioner to be installed at a factory), and air conditioners to be used outdoors (e.g., those installed in vehicles such as cars, trains, ship, and airplanes). Note that there are air conditioners which are installed in a window frame. Such an air conditioner is merely a combination of an indoor unit and an outdoor unit integrated together, and the function thereof as the indoor unit 100a and the function thereof as the outdoor unit 101a can be separated from each other.

Living space in which an air conditioner is installed: the inside of a room of a building, the inside of a cabin or a compartment of a car, a train, a ship or an airplane. A "living space" does not need to be a closed space.

Log information refers herein to a record concerning the processing or operation that the electronic device has performed and the manipulations that the user has made on the electronic device. The log information may include various kinds of information that can be obtained from the electronic device such as information about the operation status or operation date and time of the electronic device.

Examples of the log information: log information of an air conditioner, which is a typical example of an electronic device illustrated herein, includes: information about the preset temperature of the air conditioner; information about the outdoor temperature outside a living space in which the air conditioner is installed; information about the indoor temperature of the living space in which the air conditioner is installed; information about the number of revolutions of a drive system (such as a compressor's motor) for the air conditioner; and information about cleaning history of the air conditioner's filter.

Examples of log information of electronic devices other than air conditioners include the viewing history of TV programs, the recording schedule of a recorder, the date and time of operation of a washing machine and the load of laundry put into the washing machine.

User refers herein to a person who uses the service providing system, more specifically, a person who is provided with a result of analysis of the log information using the service providing system. In a general household, the head of the family who signed the contract with a service providing system may be the "user". For business use, on the other hand, a company, corporation or natural person who signed the contract with a service providing system may be the "user". If a general household, the "user" is the person who owns the electronic device, of which the log information will be given out, and the family members (including the "user" him- or herself) are the persons who use that electronic device. The "user" should originally be different from the person who uses the electronic device. In embodiments of the present disclosure, however, the "user" is supposed to be the same as the person who uses the electronic device (air conditioner) for convenience sake.

FIG. 1(A) outlines the service provided by a service providing system 1 according to this embodiment. This service providing system 1 includes a user group 1000, a data center operating company 1100, and a service provider 1200.

The user group 1000 may be a company, an association or a household, for example, and may have any size. The user group 1000 includes a plurality of devices 1010 including first and second devices and a home gateway 1020. Each of the plurality of devices 1010 has a telecommunication function and can transmit and receive data to/from other devices. The plurality of devices 1010 may include devices with configuration and ability to be connected directly to the Internet and devices without such configuration or ability. Examples of devices of the former type include smartphones, tablet terminals, dedicated display terminals, personal computers (PCs) and TV sets. Examples of the devices of the latter type include illuminators, washing machines and air conditioners. As can be seen, there may be a plurality of devices which can be connected to the Internet through the home gateway 1020. The plurality of devices 1010 in an user group 1000 may be used by one or more users 10. It should be noted that the users 10 are illustrated just for the sake of convenience and actually do not form part of this service providing system 1.

The home gateway 1020 receives log information about the device's operation from each of the plurality of devices 1010 and transmits the log information to a cloud server 1110. The home gateway 1020 accumulates the log information and feeds that log information accumulated to the cloud server 1110 once a day, for example.

Although only one home gateway 1020 is illustrated in FIG. 1(A), this is only an example. Alternatively, there may be a plurality of home gateways. If there are a number of home gateways, one of those home gateways may be connected to an external network (and which will be hereinafter referred to as a "master home gateway") and the other home gateways (which will be hereinafter referred to as "slave home gateways") may be connected to the master home gateway. Each of the slave home gateways receives and accumulates log information from one or more of the devices 1010 and uploads the log information to the server through the master home gateway. Alternatively, each slave home gateway may output a signal to operate one or more of the devices 1010 through the master home gateway.

The data center operating company 1100 includes the cloud server 1110, which is a virtualization server that operates in cooperation with various devices through the Internet, for example. The cloud server 1110 manages a group of data of huge sizes that are too big to handle with any existent general technology (i.e., so-called "big data") such as an ordinary database management tool. The data center operating company 1100 makes data management, management of the cloud server 1110 and operates a data center that makes those managements. The role played by the data center operating company 1100 will be described in detail later.

The data center operating company 1100 does not have to be a company which makes only the data management or manages the cloud server 1110. FIGS. 1(B) and 1(C) illustrate modified examples of the data center operating company 1100. FIG. 1(B) illustrates a device manufacturer which functions as the data center operating company 1100. If a device manufacturer which develops and manufactures devices included in the plurality of devices 1100 also exercises data management or manages the cloud server 1110, that device manufacturer corresponds to the data center operating company 1100. On the other hand, FIG. 1(C) illustrates a plurality of companies which together manage the cloud server 1110. As can be seen, the data center operating company 1100 does not have to be a single company. If a device manufacturer and another management company work either together or independently of each other to make data management and manage the cloud server 1110, both of them correspond to the data center operating company 1100. It should be noted that even if a device manufacturer and another management company work either together or independently of each other to make data management and manage the cloud server 1110, only the device manufacturer or the management company may function as the data center operating company 1100. Optionally, the data center operating company 1100 may function as a service provider as well.

The cloud server 1110 may be implemented as not only a piece of hardware such as a computer but also a piece of software in which the function that the cloud server 1110 needs to have is programmed.

The service provider 1200 has a server 1210. In this description, the "server" 1210 refers herein to a computer or storage medium with the ability to provide either data or services based on that data. As long as the server 1210 has that ability, its size is not particularly limited. For example, considering that data can be provided using a person's PC, either that person's PC itself or a storage medium such as a memory built in the person's PC may also be a "server". In some cases, the service provider 1200 may have no servers 1210.

It should be noted that the home gateway 1020 is not an essential component for the server providing system 1 described above. For example, if the cloud server 1110 manages every piece of data, no home gateway 1020 is needed. Also, if each and every device in a household has configuration and function to be connected to the Internet (i.e., if there are no devices that cannot be connected to the Internet by themselves), the home gateway 1020 may also be omitted. In that case, the log information may be given out directly to the cloud server 1110 by a plurality of devices 1010 through the Internet.

Next, it will be described how and where information flows in this service providing system 1.

First of all, either the first or second device in the user group 1000 transmits its own log information to the cloud server 1110 in the data center operating company 1100. In response, the cloud server 1110 receives and accumulates the log information that has been sent by the device (as indicated by the arrow 1310 in FIG. 1(A)).

Next, the cloud server 1110 of the data center operating company 1100 feeds the log information accumulated on a constant unit basis to the service provider 1200. In this case, the "constant unit" may be either a unit on which the data center operating company 1100 can sort out the information accumulated and feed it to the service provider 1200 or a unit required by the service provider 1200. Sometimes the log information may not be fed on a constant unit basis. Rather, depending on the situation, the amount of log information fed may vary. The log information is saved as needed in the server 1210 that the service provider 1200 has (as indicated by the arrow 1320 in FIG. 1(A)).

The service provider 1200 sorts out the log information into a type of information that matches the service to be provided for the users, and provides that information for the users. The users to be provided with that information may be either the users 10 who own the plurality of devices 1010 or external users 11. As to how to provide information for the users 10, 11, the service provider 1200 may directly provide information for the users 10, 11 (as indicated by the arrows 1330 and 1340 in FIG. 1(A)). Or the information may be provided for the users 10 by way of the cloud server 1110 of the data center operating company 1100 again (as indicated by the arrows 1350 and 1360 in FIG. 1(A)). Still alternatively, instead of the service provider 1200, the cloud server 1110 of the data center operating company 1100 may sort out the log information into a type of information that matches the service to be provided for the users, and feed that information to the service provider's (1200) computer.

It should be noted that the users 10 may or may not be identical with the users 11. Also, not all of the plurality of devices 1010, the cloud server 1100 and the server 1210 have to be installed in the same country. For example, all of the plurality of devices 1010 may be installed in Japan, but the cloud server 1110 and/or the server 1210 may be installed in the United States, or vice versa. If at least one of the cloud server 1110 and server 1210 provides a result of analysis in response to the user's manipulation (or control) and if the user can check out the result of analysis on a PC, for example, it can be said that the user is enjoying the benefits of that system in his or her own country. In that case, it is substantially no different from a situation where the system is installed within a single country.

It should be noted that when the log information is collected (as indicated by the arrows 1310 and 1320 in FIG. 1(A)) and when the information is given out (as indicated by the arrows 1330, 1340, 1350 and 1360 in FIG. 1(A)), if the information includes any sensitive information with which respective users 10 can be identified, then that information could be abused. That is why this system may be operated so that no sensitive personal information to identify the respective users 10 (e.g., their names) is included in the log information. If that information to identify the respective users 10 is included, the device on the transmitting end may transmit that information after having encrypted it.

2. Details of Service Providing System According to Embodiment 1

2. 1. Outline of Service Providing System 50

Next, a service providing system according to this embodiment will be described with reference to FIG. 2 and drawings that follow it.

Figure 2:
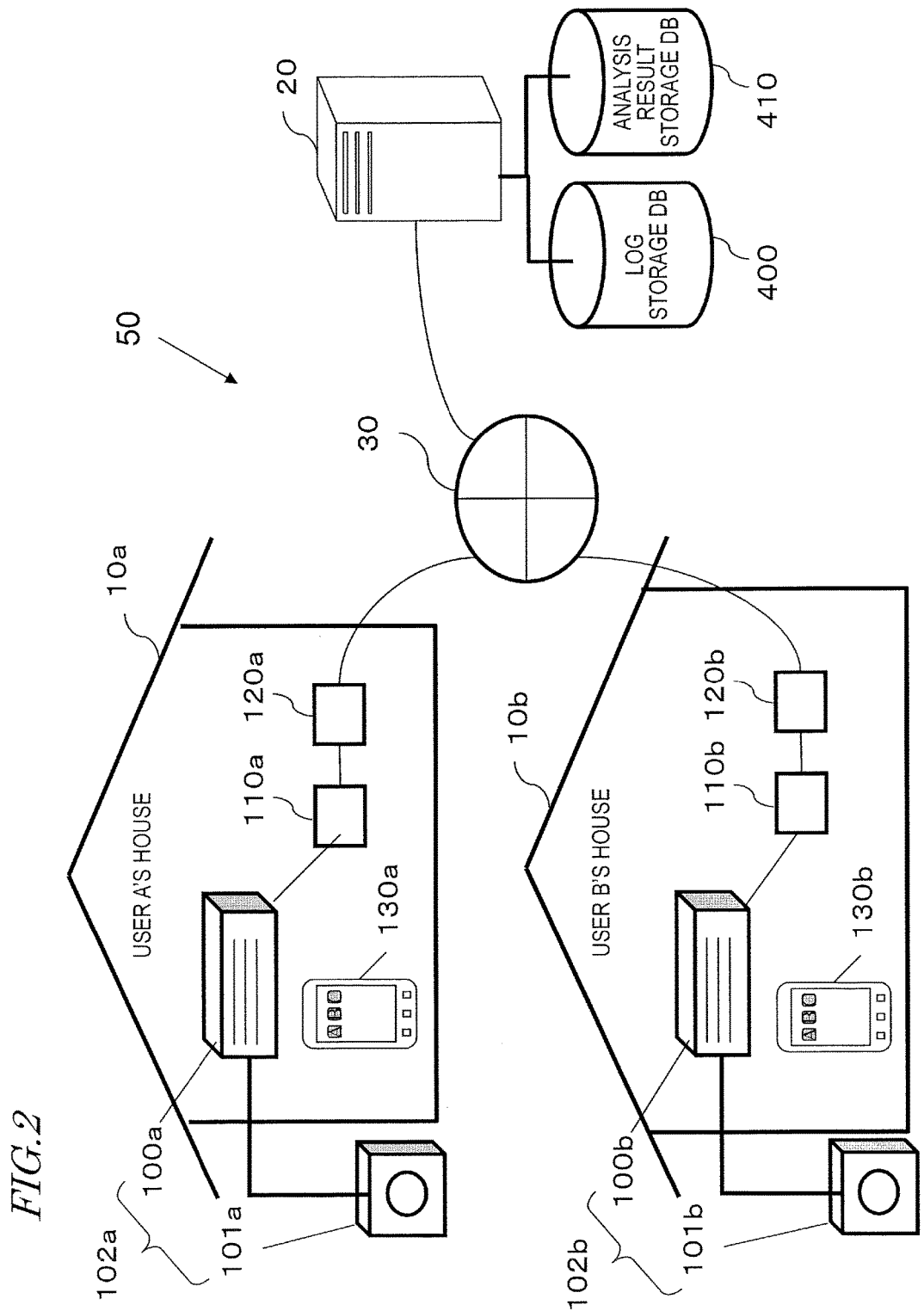
FIG. 2 Illustrates a configuration for a system according to an exemplary embodiment.

FIG. 2 illustrates a configuration for a service providing system 50 according to this embodiment. In this embodiment, the air conditioner 102a includes the indoor unit 100a and the outdoor unit 101a. An air conditioner 102b includes an indoor unit 100b and an outdoor unit 101b. The indoor units 100a and 100b shown in FIG. 2 may be included in the plurality of devices 1010 shown in FIG. 1(A). The outdoor unit 101a connected to the indoor unit 100a and the outdoor unit 101b connected to the indoor unit 100b may also be included in the plurality of devices 1010 shown in FIG. 1(A). Meanwhile, a management server 20 shown in FIG. 2 corresponds to the cloud server 1110 shown in FIG. 1.

The management server 20 of this service providing system 50 collects the log information of electronic devices which are installed in the User A's and User B's houses 10a, 10b (e.g., the air conditioners 102a and 102b) through an information communications network 30 (which will be hereinafter simply referred to as a "network 30"). And in response to an access using a mobile telecommunications terminal 103a, 103b that is a display terminal each User A or B owns, the management server 20 allows the access by identifying User A or B with a contractor, and provides the authenticated user's display terminal with his or her display data, which is generated by the management server 20. More specifically, the management server 20 generates display data by reference to pieces of information which are included in the air conditioner's log information collected and which indicate (i) a preset temperature of the air conditioner, (ii) an outdoor temperature outside a living space in which the air conditioner is installed, and (iii) an indoor temperature of the living space in which the air conditioner is installed, the display data representing a trend of change of a turnaround time that indicates how long it takes from when the air conditioner starts operating until the indoor temperature reaches the preset temperature.

As a result, a general user can sense more easily a sign of the limit of his or her air conditioner's life. For example, if the display data provided for the display terminal indicates that the turnaround time is increasing, the user can see that his or her air conditioner's life is close to a limit. In addition, if the turnaround time is increasing, one can speculate that more power is being consumed, compared to when the user purchased the air conditioner, for example. That is why in that case, it is easy to prompt the user to take an appropriate action to avoid wasting power such as asking the manufacturer to repair it or buying a new one. Consequently, the power can be saved.

It should be noted that the "display data" means data that needs to be used to generate an object to be displayed. For example, the "display data" may be data that can be restored and displayed as it is such as image data. The "display data" may also be mere numerical value data. If the display terminal receives the numerical value data and generates a user interface which is an object to be displayed, then the numerical value data can be said to be a sort of display data. Furthermore, the "display data" includes not only visual display data but also auditory display data as well. It will be described in detail later how the display data may be displayed.

Specific configurations will now be described. It should be noted that the User A's and User B's houses 10a and 10b shown in FIG. 2 may have the same configuration. That is why only the configuration of the User A's house 10a will be described for the sake of convenience.

2. 2. Configuration of Service Providing System 50

First of all, the configuration of the User A's house 10a will be described and the indoor unit 100a and the outdoor unit 101a of the air conditioner 102a will be described in detail. Subsequently, the configuration of the management server 20 will be described. After that, it will be described how the air conditioner 102a, the management server 20 and other components operate in the service providing system 50.

2. 2. 1. User A's House 10a

An air conditioner 102a, a gateway 110a and a router 120a are provided for User A's house 10a. User A also owns a mobile telecommunications terminal 130a.

The indoor unit 100a and the outdoor unit 101a of the air conditioner 102a have various sensors. The air conditioner 102a transmits log information that has been obtained using those sensors to the gateway 110a via the indoor unit 100a at a predetermined timing. The predetermined timing may be either when, or a certain period of time after, the log information is obtained, or may also be a time when the amount of log information temporarily accumulated in the memory (not shown) built in the indoor unit 100a exceeds a certain level.

The communication between the indoor unit 100a and the gateway 110a may be either a wired one or a wireless one. If a wired communication is carried out between them, a cable compliant with the Ethernet™ standard may be used. On the other hand, a wireless communication may be carried out between them via a specified low power radio station compliant with the IEEE 802.15.4d or IEEE 802.15.4g standard, for example, which are set in compliance with the Japanese laws and regulations, or may also be carried out compliant with the WiFi™ standard, the Bluetooth™ standard, or the Zig Bee™ standard.

The gateway 110a accumulates, in its internal storage device (not shown), the log information that has been received from the air conditioner 102a. The gateway 110a may transmit the accumulated log information to the management server 20 at a predetermined time once a day. Specifically, on receiving the log information to be transmitted from the gateway 110a, the router 120a generates a plurality of packets which designates the management server 20 as their destination and sends those packets to the management server 20 over a network 30. The network 30 may be a public line or a leased line that connects the management server 20 and the User A's house 10a together. In this embodiment, the network 30 is supposed to be a public line.

In this embodiment, the gateway 110a and the router 120a are provided as two separate devices. However, this is only an example. Alternatively, the gateway 110a may have a router function and the router 120a does not have to be provided separately as a single device.

Also, as already described with respect to the home gateway 1020 shown in FIG. 1, if the air conditioner 102a has configuration and ability to transmit log information directly over the network 30, the gateway 110a does not have to be provided.

The management server 20 includes a log storage database (DB) 400 and an analysis result storage database (DB) 410. The management server 20 receives the log information of the air conditioner 102a from the gateway 110a and stores it in the log storage DB 400. The log storage DB 400 and analysis result storage DB 410 will be described in detail later.

In response to User A's manipulation, the mobile telecommunications terminal 130a sends a request to display the performance of the User A's air conditioner 102a to the management server 20. Responsive to this request, the management server 20 transmits display data to present information about the performance of User A's own air conditioner 102a (service information) to the mobile telecommunications terminal 130a. On receiving the display data from the management server 20, the mobile telecommunications terminal 130a presents the display data on the display screen. By looking at that air conditioner's (102a) performance information presented on the display screen, the user can understand the performance of his or her own air conditioner 102a.

Air Conditioner's (102a) Specific Configuration

Next, a configuration for allowing the air conditioner 102a to get log information will be described with reference to FIGS. 3 and 4.

Figure 3:
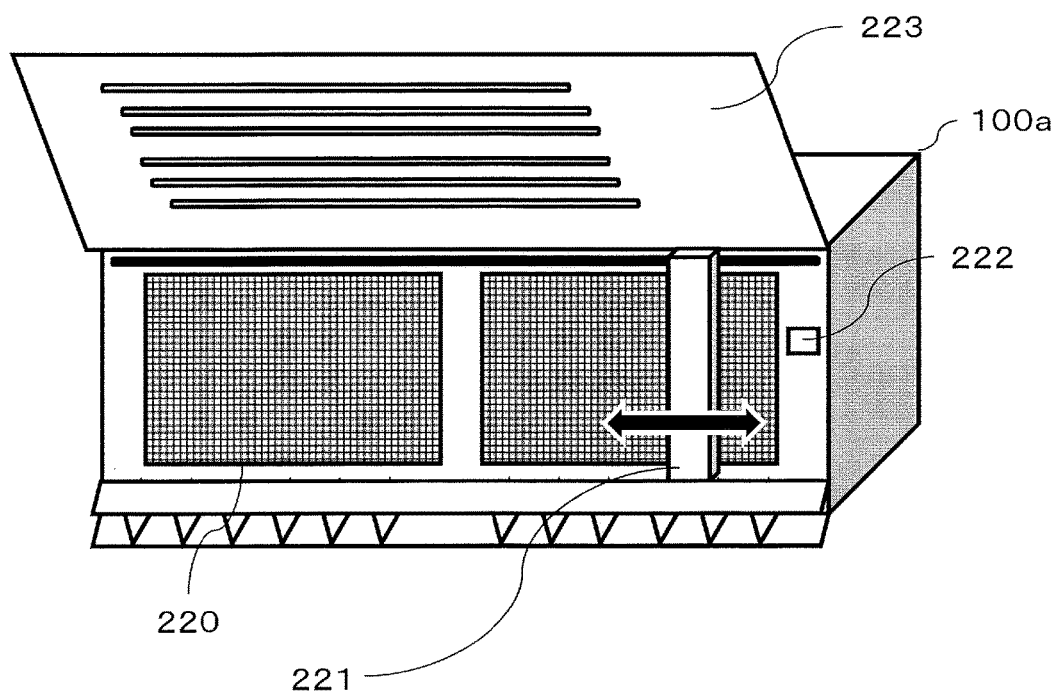
FIG. 3 Illustrates a group of sensors provided for an indoor unit 100$a$ of an air conditioner 102$a$ according to an exemplary embodiment.

FIG. 3 shows a schematic configuration of the indoor unit 100a of the air conditioner 102a.

The indoor unit 100a includes a filter 220, a filter cleaning mechanism 221, a cleaning sensor 222, and a cover 223. The configuration of FIG. 3 shows the external appearance of the indoor unit 100a when the cover 223 is opened. The filter cleaning mechanism 221 cleans the filter 220 as instructed by a processor 205 (FIG. 4). The filter 220 is cleaned by the filter cleaning mechanism 221 moving in the longitudinal direction of the filter 220 (the direction of the double-headed arrow shown in FIG. 3) while being in close contact with the filter 220. The cleaning of the filter 220 is performed when the operating time of the air conditioner 102a exceeds a predetermined amount of time, when the operation is suspended, or when an instruction from a user is received, for example.

The cleaning sensor 222 detects completion of a cleaning by the filter cleaning mechanism 221. For example, the cleaning sensor 222 detects completion of a cleaning when the filter cleaning mechanism 221 makes two rounds of round-trip movement in the longitudinal direction across the filter 220.

Figure 4:
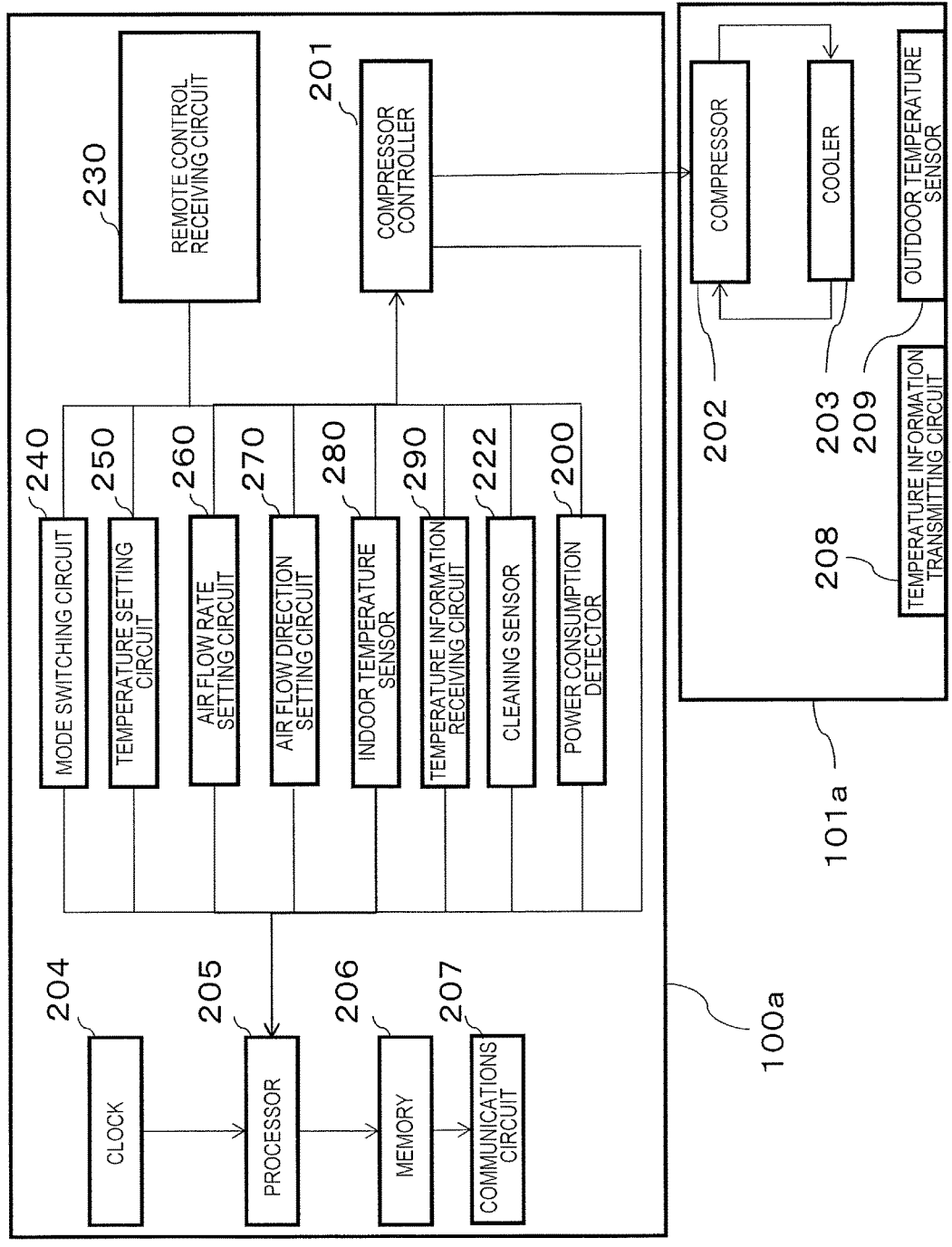
FIG. 4 A block diagram illustrating a configuration for the indoor unit 100$a$ and an outdoor unit 101$a$ of the air conditioner 102$a$ according to an exemplary embodiment.

FIG. 4 shows a hardware configuration of the indoor unit 100a and the outdoor unit 101a of the air conditioner 102a.

First, a configuration of the indoor unit 100a will be described.

The indoor unit 100a includes a compressor controller 201, a clock 204, the processor 205, a memory 206, a communications circuit 207, a remote control receiving circuit 230, and various circuits and sensors. The various circuits and sensors include a power consumption detector 200, the cleaning sensor 222, a mode switching circuit 240, a temperature setting circuit 250, an air flow rate setting circuit 260, an air flow direction setting circuit 270, an indoor temperature sensor 280, and a temperature information receiving circuit 290.

The compressor controller 201 controls the operation of a compressor 202 of the outdoor unit 101a. More specifically, the compressor controller 201 obtains information about the number of revolutions of a drive system (not shown) which is built as an integral component in the compressor 202 and transmits the information thus obtained to the processor 205. In this case, the "drive system" may be a motor, for example. In the following description, the drive system is supposed to be a motor.

The clock 204 generates a clock signal to be a reference for collecting the log information, and supplies a signal representing the reference time to the processor 205.

The processor 205 is a circuit which controls the operation of the air conditioner 102a (the indoor unit 100a and the outdoor unit 101a) and which collects log information from those sensors shown in FIG. 4. The memory 206 temporarily stores the log information thus collected. And the communications circuit 207 is a wired or wireless telecommunications device which transmits the log information to the gateway 110a at a predetermined timing.

The remote control receiving circuit 230 receives a user's instruction transmitted from a remote control (not shown). Where the remote control transmits a user's instruction using infrared light, the remote control receiving circuit 230 is an infrared light receiving circuit. Where the remote control transmits a user's instruction using the WiFi™ standard, the remote control receiving circuit 230 is a wireless communication module for communication in conformity with the WiFi standard. The remote control receiving circuit 230 outputs a signal corresponding to the received user's instruction. As a result, a circuit is activated, which is designed to operate in response to the signal.

The description of the operation performed by the remote control receiving circuit 230 will be omitted below for the sake of simplicity. For example, when a user performs an operation mode switching operation, a signal is processed via the remote control receiving circuit 230, but this process will not be described below. Instead, the description will only state that the mode switching circuit 240 switches an operation mode in response to an instruction from a user.

Each of the various circuits and sensors described above transmits, to the processor 205, information about the power consumption, the sensor detection results, and the current settings.

The power consumption detector 200 is a circuit for detecting in real time the power being consumed by the air conditioner 102a, and may detect the amount of power consumed by a power supply (not shown) for the air conditioner 102a, for example.

The cleaning sensor 222 detects completion of a cleaning by the filter cleaning mechanism 221 as described above.

The mode switching circuit 240 switches between different operation modes, such as cooling, heating and dehumidification, in response to a user's instruction to change the operation mode of the air conditioner 102a.

The temperature setting circuit 250 sets a target room temperature as instructed by a user.

The air flow rate setting circuit 260 sets an air flow rate as instructed by a user.

The air flow direction setting circuit 270 sets an air flow direction as instructed by a user.

The indoor temperature sensor 280 detects the indoor temperature of a living space in which the air conditioner is installed.

The temperature information receiving circuit 290 receives information about the outdoor temperature outside the living space in which the air conditioner is installed, which is transmitted from a temperature information transmitting circuit 208 (to be described later) of the outdoor unit 101a. The communication is performed via a wired connection running inside the pipe connecting between the indoor unit 100a and the outdoor unit 101a, for example.

Next, a configuration of the outdoor unit 101a will be described.

The outdoor unit 101a includes the compressor 202, a cooler 203, the temperature information transmitting circuit 208, and an outdoor temperature sensor 209.

The compressor 202 is a part which compresses the refrigerant in the heat-pump unit, and operates using a built-in motor. If the motor is run at high velocities, the refrigerant can be compressed quickly and the heat-pump unit's ability to increase cold air and heat generated by itself improves. On the other hand, if the motor is run at low velocities, the heat-pump unit's ability to increase cold air and heat declines. The cooler 203 is a part which cools the compressor 202. Specific configurations of the compressor 202 and cooler 203 are well known in the art, and description thereof will be omitted herein.

The temperature information transmitting circuit 208 transmits information about the temperature detected by the outdoor temperature sensor 209 to the temperature information receiving circuit 290.

The outdoor temperature sensor 209 measures the outdoor temperature outside the living space in which the air conditioner is installed or, more specifically, the ambient air temperature around the outdoor unit 101a. According to this embodiment, the outdoor temperature means the outdoor temperature where the outdoor unit 101a is installed. Preferably, the outdoor temperature sensor 209 is provided in the vicinity of the compressor 202.

Figure 5:
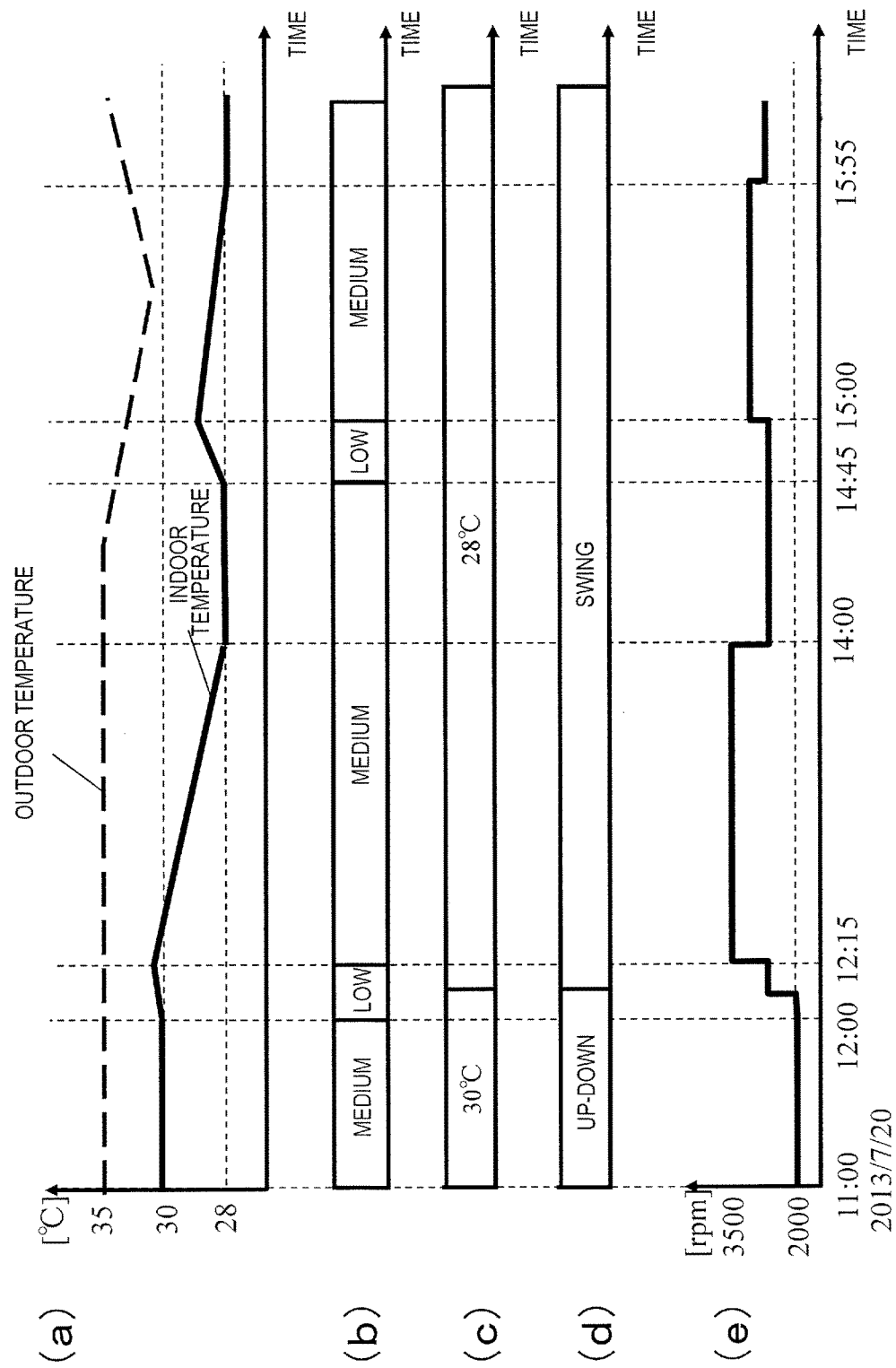
FIG. 5 ($a$) through ($e$) show exemplary pieces of operation log information that can be obtained from an air conditioner according to an exemplary embodiment.

Portions (a) through (e) of FIG. 5 show exemplary pieces of log information that can be obtained from the air conditioner 102a. In each of these portions, the abscissa represents the time.

Portion (a) of FIG. 5 shows log information about the outdoor temperature and the indoor temperature, which are indicated by a dashed-line graph and a solid-line graph, respectively. Portion (b) of FIG. 5 shows log information about the air flow rate of the air conditioner 102a. Portion (c) of FIG. 5 shows log information about the indoor temperature settings. Portion (d) of FIG. 5 shows log information about the direction of the air flow output from the indoor unit 100a. And portion (e) of FIG. 5 shows log information about the number of revolutions of the motor that operates the compressor 202. In this case, the number of revolutions is indicated in revolutions per minute (rpm).

In these portions (a) through (e) of FIG. 5, multiple kinds of log information collected at particular points in time are summarized on the same sheet of paper to make the reader understand more easily how the system works. For example, look at the period of time from 12:00 through 14:00.

The air flow rate setting circuit 260 detects that the air flow rate was changed from "medium" to "low" at 12:00 (see portion (b) of FIG. 5). As the air flow rate is changed, the indoor temperature sensor 280 detects an increase in the indoor temperature (see portion (a) of FIG. 5). Soon after that, the temperature setting circuit 250 changes the indoor temperature from 30° C. to 28° C. in response to an instruction from a user (see portion (c) of FIG. 5). Also, in response to an instruction from a user, the air flow direction setting circuit 270 changes the air flow direction from "swing (up-down)" to "swing (left-right)".

As the user changes the air flow rate setting and lowers the preset temperature, the number of revolutions of the motor of the compressor 202 increases. After the preset temperature is further lowered, the compressor controller 201 senses the number of revolutions of the motor rise stepwise (see portion (e) of FIG. 5).

At 14:00, the indoor temperature sensor 280 senses that the indoor temperature has reached 28° C. (see portion (a) of FIG. 5). Then, the compressor 202 decreases the number of revolutions of the motor. The compressor controller 201 senses the decrease in the number of revolutions of the motor (see portion (e) of FIG. 5).

Next, it will be described how the system works in an exemplary situation where cleaning is performed.

Figure 6:
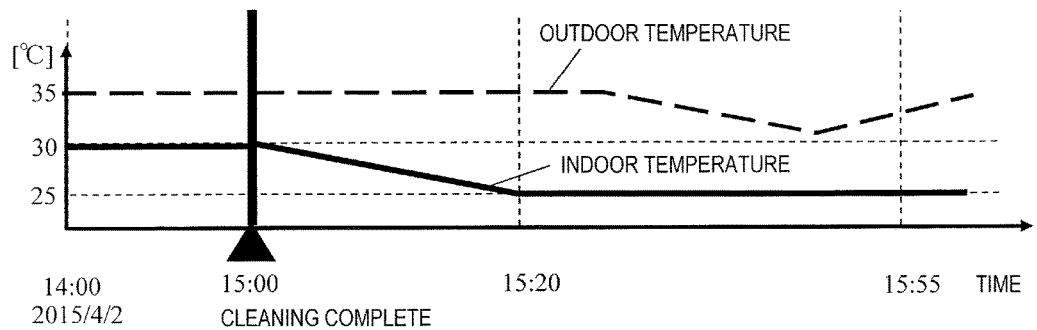
FIG. 6 Shows an example of log information about the air conditioner's cleaning history which can be obtained from the air conditioner according to the exemplary embodiment.

FIG. 6 shows log information about the outdoor temperature and the indoor temperature and log information obtained by the cleaning sensor 222. The cleaning sensor 222 detects completion of a cleaning of the filter 220 by the filter cleaning mechanism 221 at 15:00. As a result, the cooling efficiency improves. The indoor temperature sensor 280 senses a decrease in the indoor temperature.

It should be noted that as the cooling efficiency improves since the filter 220 has been cleaned, the operation of decreasing the number of revolutions of the compressor's (202) motor may be performed. If such an operation has been performed, the compressor controller 201 will sense a decrease in the number of revolutions of the motor.

As described above, the results of detection obtained by those sensors are collected as pieces of log information by the processor 205 and accumulated in the memory 206.

2. 2. 2. Configuration of Management Server 20

Figure 7:
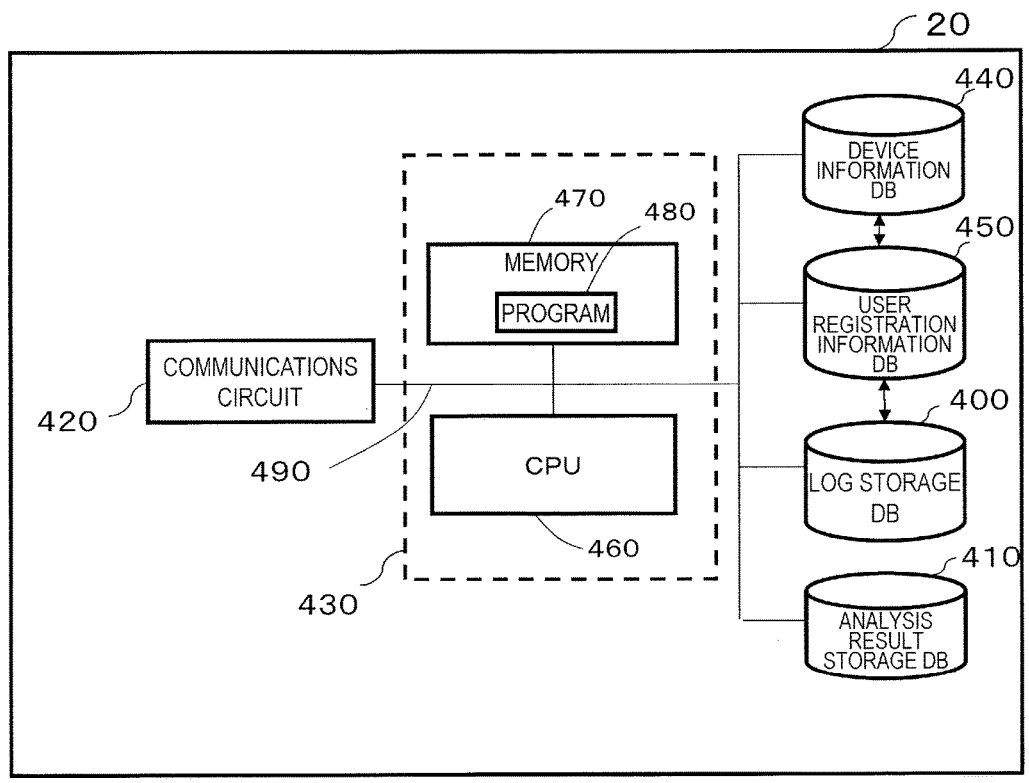
FIG. 7 A block diagram illustrating a hardware configuration for a server according to an exemplary embodiment.

FIG. 7 illustrates a hardware configuration for the management server 20, which includes multiple databases 400, 410, 440 and 450, a communications circuit 420, a CPU 460, and a memory 470. These components are connected together with a bus 490 and can exchange data with each other.

The communications circuit 420 communicates with other telecommunications devices (such as the router 120*a* shown in FIG. 2) over the network 30. The communications circuit 420 makes communications compliant with the Ethernet™ standard, for example.

The CPU 460 controls the operation of the management server 20, and performs a group of instructions which are described in the computer program 480 that has been loaded in the memory 470. As a result, the CPU 460 can perform various functions. The computer program 480 describes a group of instructions that should be carried out to allow the management server 20 to perform the sequences to be described later with reference to FIGS. 10 and 12, for example.

The computer program 35 may be circulated as a product on the market by being recorded on a storage medium such as a CD-ROM or downloaded through a telecommunications line such as the Internet. When loaded with the computer program 480, a device including the hardware shown in FIG. 7 (such as a PC) may function as a management server 20 according to this embodiment.

Optionally, the CPU 460 and the memory 470 that stores the computer program 480 may also be implemented as a piece of hardware such as a DSP (digital signal processor) in which a computer program has been installed in a single semiconductor circuit. Such a DSP can carry out all by itself (i.e., by a single integrated circuit) every processing to be performed by the CPU 460 when executing the computer program 480 described above. Thus, the CPU 460 and memory 470 shown in FIG. 7 may be replaced with such a DSP as the processor 430. Next, the functional configuration to be realized by the processor 430 will be described with reference to FIG. 8. The processing to be carried out about the various databases shown in FIG. 7 will also be described.

Figure 8:
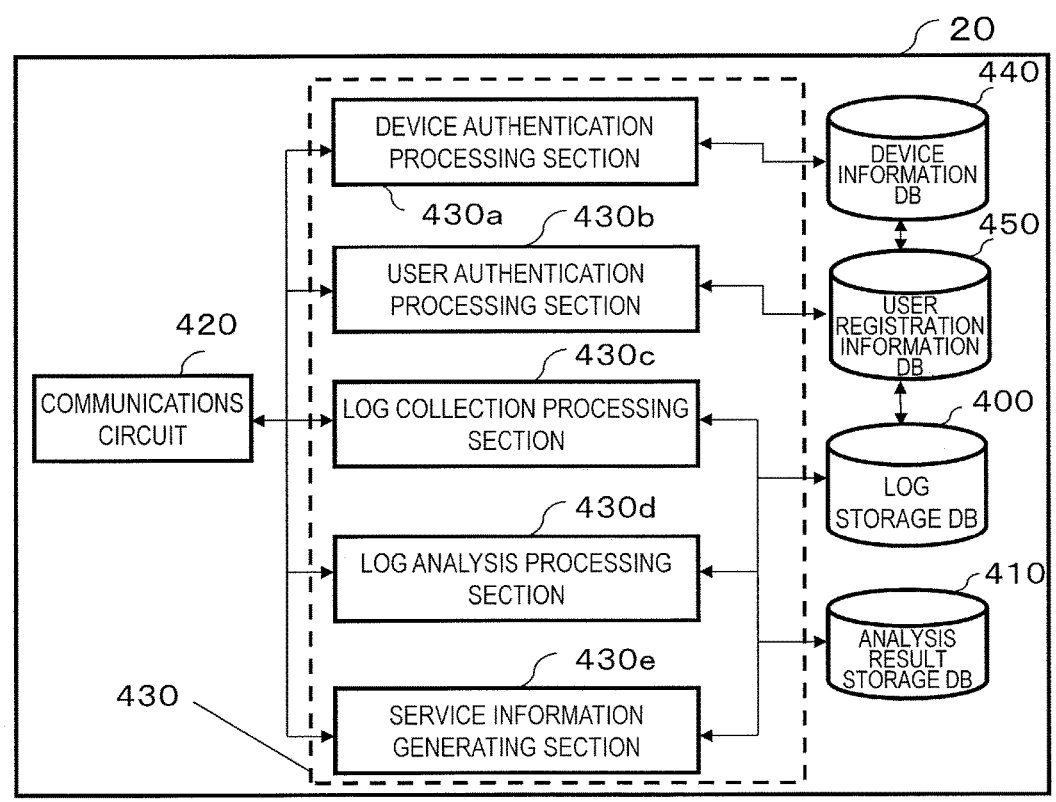
FIG. 8 A block diagram illustrating a functional configuration for a server according to an exemplary embodiment.

FIG. 8 is a block diagram illustrating a functional configuration of the management server 20. In FIG. 8, any component also shown in FIG. 7 and having substantially the same function as its counterpart is identified by the same reference numeral as its counterpart's and description thereof will be omitted herein.

The management server 20 includes multiple databases 400, 410, 440 and 450, a communications circuit 420 and a processor 430.

In FIG. 8, illustrated are five blocks of functions (namely, a device authentication processing section 430*a*, a user authentication processing section 430*b*, a log collection processing section 430*c*, a log analysis processing section 430*d*, and service information generating section 430*e*) to be performed by the processor 430. The CPU executing the software program functions as the device authentication processing section 430*a* at a certain point in time, and functions as the user authentication processing section 430*b* at another point in time. The same can be said about the other components. Optionally, at least one of these five functional blocks may be implemented as a piece of hardware which performs dedicated processing (such as a DSP).

The device authentication processing section 430*a* authenticates the device which generates and transmits log information at the user's house. The management server 20 receives only the log information of such a device at the user's house that has been authenticated by the device authentication processing section 430*a*. In making the authentication, the device authentication processing section 430*a* refers to a device information database (DB) 440, in which device information to identify a registered device uniquely is stored. The device information may be a device ID to be given by the manufacturer to each product, for example. Alternatively, the device information may also be an MAC (media access control) address which is given as a unique address to each piece of hardware functioning as a network device such as a communications circuit when communications are going to be carried out through the network 30.

In the device information DB 440, each device ID is associated with a product type ID which indicates the product type of that device and a lot number indicating the manufacturing lot of that device.

The user authentication processing section 430*b* verifies whether the user who is asking the service providing system 50 for the service information is an authentic user (i.e., whether he or she is really a person who signed the contract with the system). The management server 20 communicates with only the user who has been authenticated by the user authentication processing section 430. In making the authentication, the user authentication processing section 430*b* refers to a user registration information database (DB) 450, in which information to identify a registered user uniquely is stored.

The log collection processing section 430*c* classifies the log information that has been received via the communications circuit 420 according to user or device and accumulates the information in a log storage DB 400.

The log analysis processing section 430*d* analyzes the log information accumulated in the log storage DB 400 with respect to a particular user's particular device and generates a result of analysis. Then, the log analysis processing section 430*d* stores the result of analysis in an analysis result storage DB 410 on a user-by-user basis and on a device-by-device basis.

The service information generating section 430*e* extracts one or more analysis results with respect to a particular device by reference to the analysis result storage DB 410, thereby generating information to be presented to the user (i.e., service information).

In FIGS. 7 and 8, the management server 20 is illustrated as including multiple databases 400, 410, 440 and 450. However, this is only an example. Alternatively, at least one of these databases 400, 410, 440 and 450 may be provided outside of the management server 20. For example, at least one of these databases 400, 410, 440 and 450 may be connected to the network 30 and may function as a database server. In that case, the database may be provided to communicate with the management server 20 and allow the processor 430 to provide any piece of necessary information.

It should be noted that the device information DB 440, user registration information DB 450 and log storage DB 400 are associated with each other. As a result, when a particular device's log information is received, the log information can be accumulated systematically.

Figure 9:
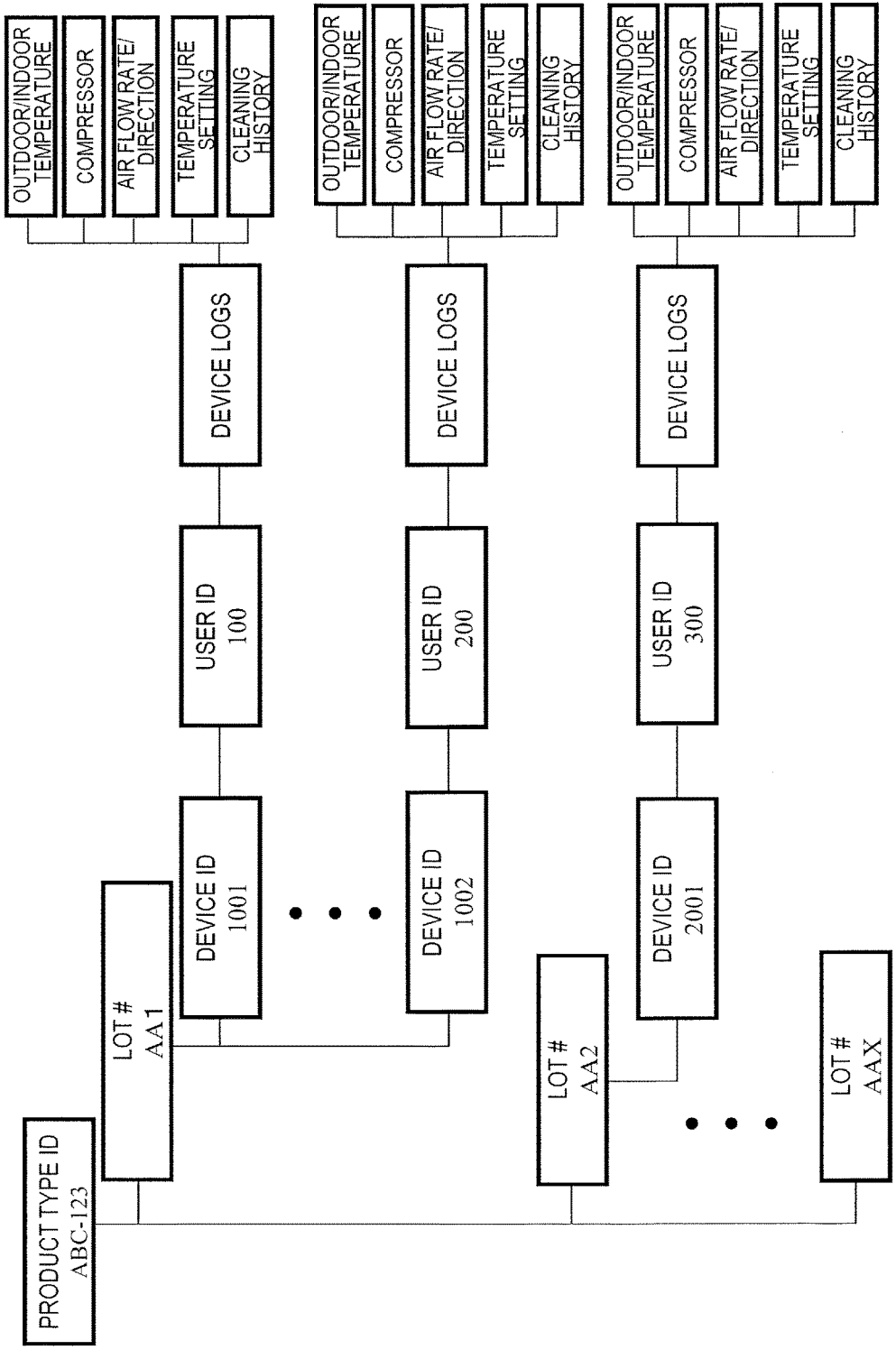
FIG. 9 Illustrates an exemplary configuration #1 for a DB which stores the operation logs of an air conditioner to be managed by a server in an exemplary embodiment.

FIG. 9 shows exemplary pieces of devices' information which are associated with each other by reference to the device information DB 440, user registration information DB 450 and log storage DB 400 shown in FIGS. 7 and 8. The product type IDs, lot numbers, and device IDs shown in FIG. 9 have been sorted out by reference to the device information DB 440. The user IDs to identify the users have been sorted out by reference to the user registration information DB 450. The devices' log information (including pieces of more specific information under the "device logs" shown in FIG. 9) has been sorted out by reference to the log storage DB 400. The log information is managed by associating these pieces of information with each other as shown in FIG. 9.

2. 2. 3. Log Information Collecting Operation by Service Providing System 50

Figure 10:
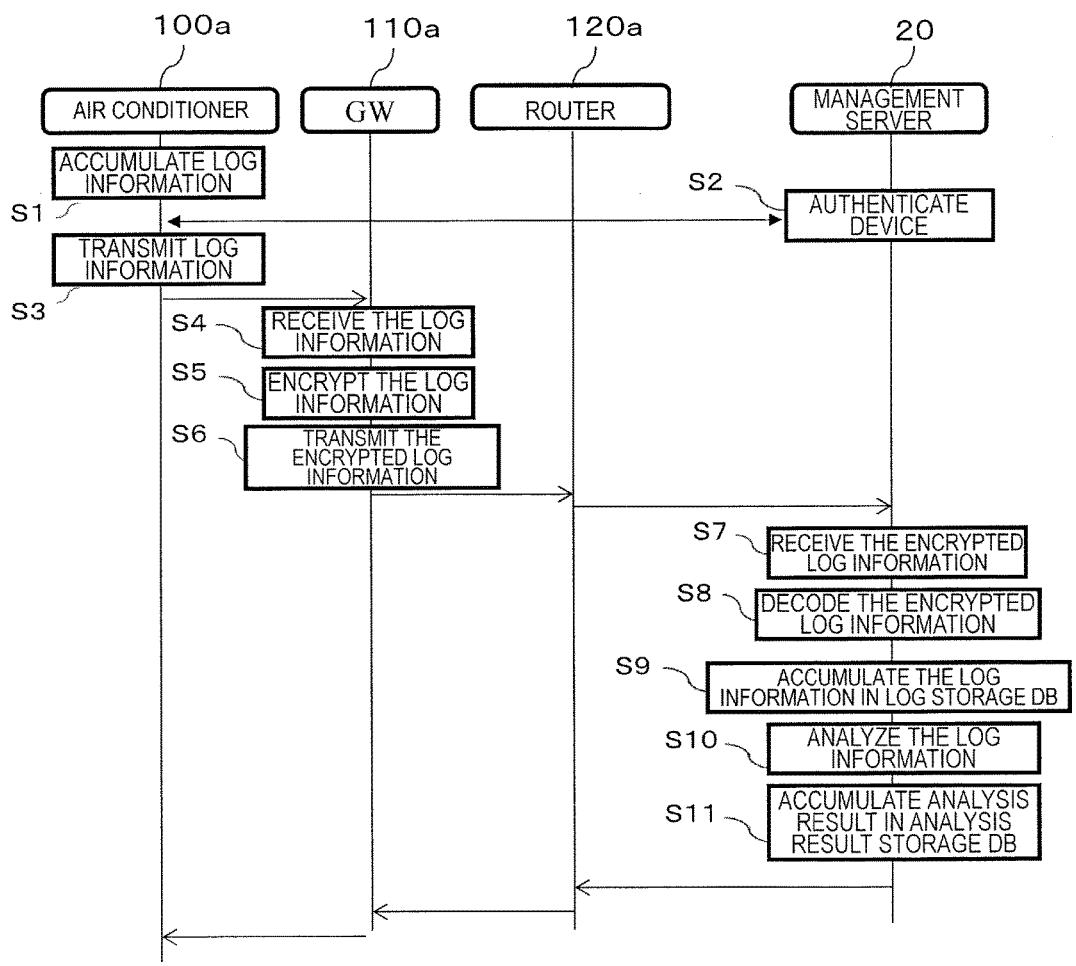
FIG. 10 Shows a sequence in which operation logs are collected by a server from an air conditioner according to an exemplary embodiment.

FIG. 10 shows the sequence of communications to be carried out between the indoor unit 100*a* of the air conditioner 102*a* and the management server 20 when the air conditioner's (102*a*) log information is collected by the management server 20.

In Step S1, the processor 205 of the indoor unit 100*a* (see FIG. 4) collects the log information at a predetermined rate and accumulates it in the memory 206 (see FIG. 4). The predetermined rate may be once a minute or once every ten seconds, for example. But the rate may also be set to be any other appropriate one.

In Step S2, when the data size of the log information accumulated in the memory 206 reaches a predetermined threshold value, the processor 205 makes the communications circuit 207 (see FIG. 4) output a device authentication request in order to transmit the log information to the management server 20. This device authentication request is transmitted to the management server 20 via the GW 110*a* and the router 120*a*. If the device authentication processing section 430*a* of the management server 20 verifies that the air conditioner 102*a* is a registered device, the sequence advances to Step S3.

In Step S3, the communications circuit 207 of the indoor unit 100*a* (see FIG. 4) transmits the log information to the gateway (GW) 110*a*.

In Step S4, the GW 110*a* receives the log information. Next, the GW 110*a* encrypts the log information in Step S5 and then transmits the encrypted log information to the router 120*a* in Step S6. In response, the router 120*a* forwards the encrypted log information to the management server 20. Even though communications between the router 120*a* and the management server 20 are supposed to be carried out in this embodiment by the packet exchange method, packetize processing and depacketize processing may also be carried out by any other known method. Thus, detailed description of that processing will be omitted herein.

In Step S7, the communications circuit 420 of the management server 20 (see FIGS. 7 and 8) receives the encrypted log information. The log collection processing section 430*c* decodes the encrypted log information in Step S8 and then accumulates the log information thus obtained in the log storage DB 400 in Step S9.

In Step S10, the log analysis processing section 430*d* analyzes the log information. The analysis of the log information is carried out on respective air conditioners and on the common lot between those air conditioners. Then, in Step S11, the log analysis processing section 430*d* stores the results of analysis in the analysis result storage DB 410. Thereafter, the communications circuit 420 of the management server 20 sends a notification that the log information has been received and accumulated successfully to the indoor unit 100*a*. Alternatively, the communications circuit 420 of the management server 20 may send this notification when the processing step S9 is done.

As a result of the processing described above, pieces of log information and analysis results are accumulated one after another in the log storage DB 400 and analysis result storage DB 410.

In the embodiment described above, the GW 110*a* is supposed to encrypt the log information. However, this is only an example. Alternatively, the indoor unit 100*a* of the air conditioner 102*a* may perform the encryption processing and transmit the encrypted log information to the GW 110*a*. In that case, the GW 110*a* may just forward the encrypted log information that has been received from the indoor unit 100*a* to the management server 20 without subjecting the encrypted log information to any particular processing.

2. 2. 4. Analysis of Log Information by Service Providing System 50

FIG. 11 shows results of analysis based on the operation log information that has been collected by the management server 20 from the air conditioner 102*a* as stored in the analysis result storage DB 410. Conditions are described in association with a device ID and a lot number, and the results/trends when those conditions are satisfied are described there.

For example, take a look at the upper two rows R1 and R2. The conditions and results of R1 and R2 are pieces of information about the total operation hours, the cooling efficiency and the heating efficiency that were collected by a maintenance person when he or she visited users' houses. In addition, it was also collected as an additional piece of information whether or not any failure occurred when those conditions were satisfied.

Next, look at the lower two rows R3 and R4. The data on these rows does not have to be pieces of information that were collected by a maintenance person. For example, a developer who works for the maker of the air conditioner may define the relation between the dustiness of the filter and the power consumption as data, or may also define the relation between the period of time for which the filter 220 has not been cleaned and the power consumption as data.

2. 2. 5. Presentation of Analysis Results of Log Information

Figure 12:
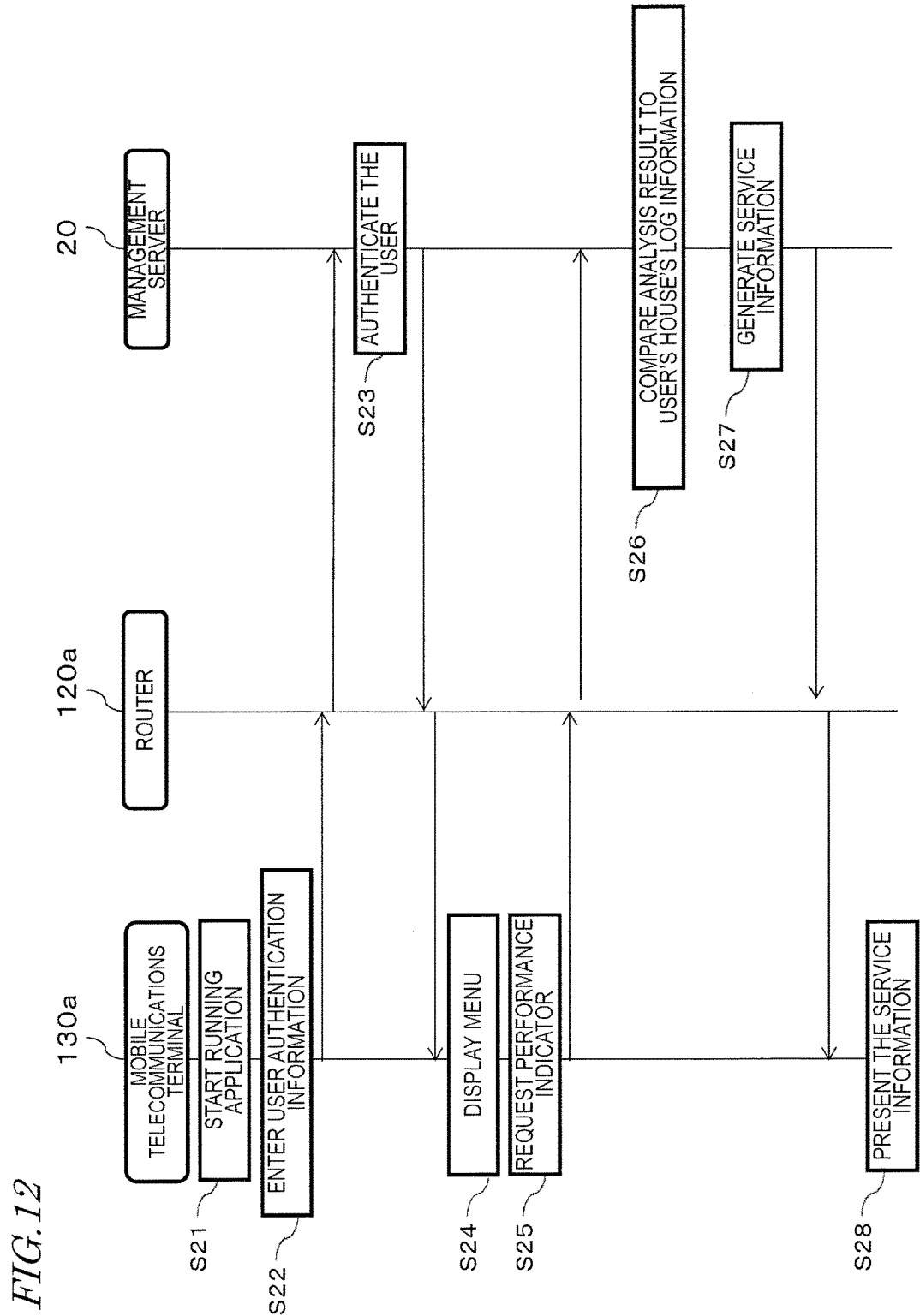
FIG. 12 Shows a sequence in which a server according to an exemplary embodiment transmits information about the air conditioner's operation logs collected to a display terminal.

FIG. 12 shows the sequence of communications to be made when the service information that has been generated based on the log information of the air conditioner 102*a* is exchanged between a mobile telecommunications terminal 130*a* that is an exemplary display terminal and the management server 20. It should be noted that wireless communications may be carried out compliant with the WiFi™ standard, for example, between the mobile telecommunications terminal 130*a* and the router 120*a*. In FIG. 12, the router 120*a* is supposed to have only the ability to relay communications.

In Step S21, User A starts to run an application that has been installed in advance in the mobile telecommunications terminal 130*a*. Then, in Step S22, a dialog box prompting the user to enter his or her personal information to authenticate him or her (which will be hereinafter referred to as "user authentication information") is presented on the display screen of the mobile telecommunications terminal 130*a*. In response, the user enters the user authentication information, which may be his or her user ID and password.

In Step S23, the user authentication processing section 430*b* of the management server 20 (see FIG. 8) sees, by reference to the user registration information DB 450, if there is any piece of user registration information that matches the user authentication information entered. If the answer is YES, the user authentication processing section 430*b* (see FIG. 8) notifies the mobile telecommunications terminal 130*a* that User A has been authenticated successfully.

In Step S24, the application presents a menu on the display screen of the mobile telecommunications terminal 130*a*.

In Step S25, User A sends a request to indicate the performance of the air conditioner 102*a* (which will be hereinafter referred to as a "performance indication request"). The performance indication request is a request for information about the air conditioner's (102a) performance indicating the signs of a life limit of the air conditioner 102a and/or whether or not the air conditioner 102a needs maintenance.

The service information generating section 430e compares the analysis results to the log information of the user's house in Step S26, and then generates service information in Step S27. The service information generating section 430e outputs display data indicating the service information generated to the mobile telecommunications terminal 130a via the communications circuit 420.

In Step S28, the mobile telecommunications terminal 130a presents the service information display data thus received on its display screen.

In the example described above, it is not until the performance indication request is received that the management server 20 performs the processing steps S26 and S27. However, this processing is only an example. Alternatively, before the performance indication request is received, part of the service information generation processing (e.g., only the processing step S26) may be performed in advance. As a result, the processing of generating service information can be speeded up. However, if the processing that uses old log information were performed, then the performance would not be indicated accurately. For that reason, whenever a predetermined period of time passes, the processing step S26 may be updated. Optionally, the management server 20 may generate service information and send push notification to the mobile telecommunications terminal at the timing when the log is received and log information is analyzed, instead of the timing when the performance indication request is received.

Next, examples of service information performance indicators to be displayed on the mobile telecommunications terminal 130a will be described with reference to FIGS. 13 to 17.

FIGS. 13 to 17 show examples of air conditioner's performance indicator information to be displayed on the mobile telecommunications terminal 130a.

FIGS. 13 to 16 each show, using sample data that were collected at three or more points in time, the trend of change of the turnaround time indicating how long it took from when the air conditioner starts operating until the indoor temperature reached the preset temperature, in a situation where there was a constant relation between the indoor temperature of the living space in which the air conditioner is installed and the outdoor temperature outside the living space. Specifically, the "situation where there was a constant relation between the indoor temperature and the outdoor temperature" refers in this embodiment to a situation where the outdoor temperature is 35° C. and the indoor temperature is 33° C.

Figure 13:
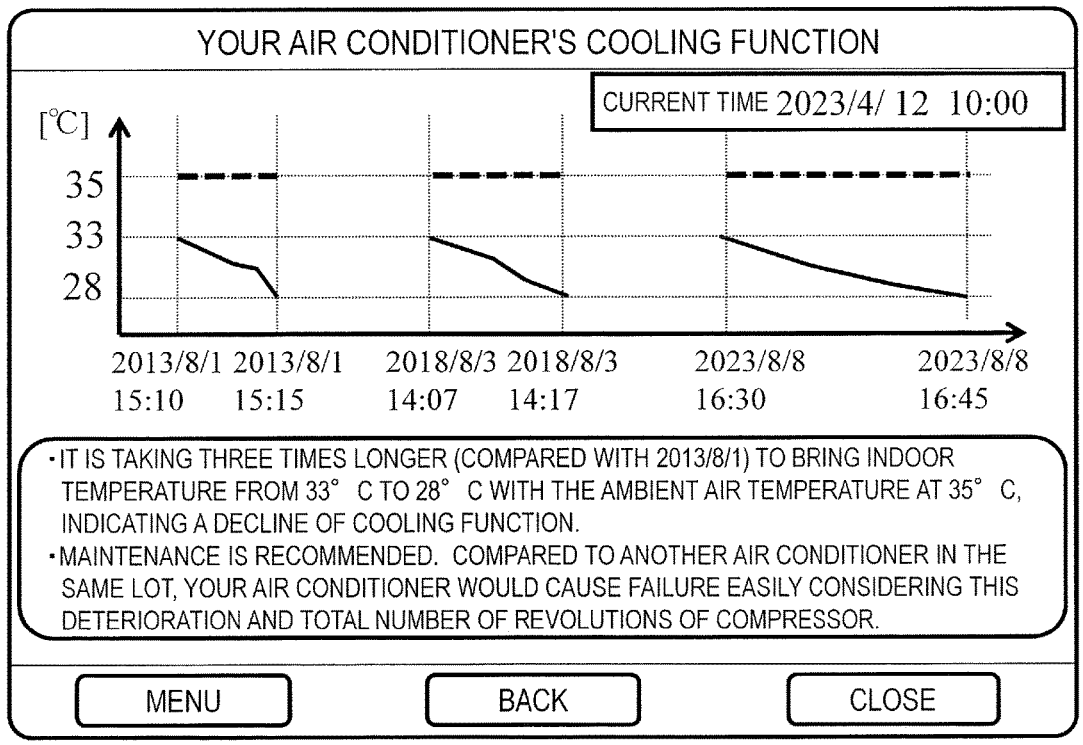
FIG. 13 Illustrates UI Sample #1 of the air conditioner's operation logs to be presented on the display terminal according to an exemplary embodiment.
Figure 14:
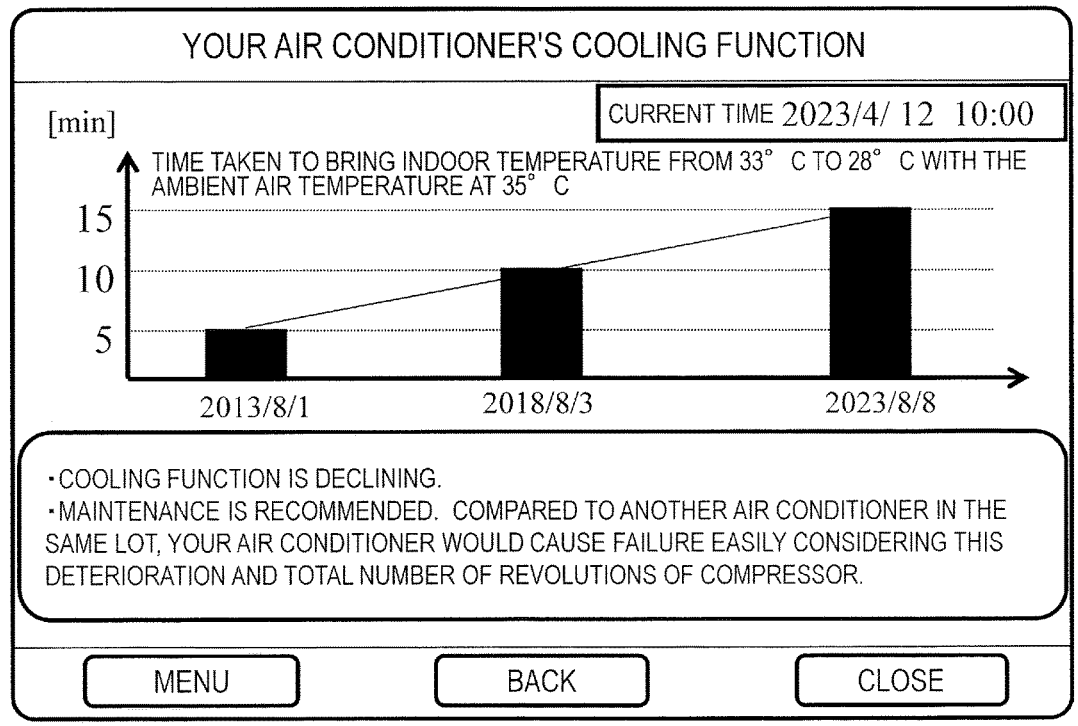
FIG. 14 Illustrates UI Sample #2 of the air conditioner's operation logs to be presented on the display terminal according to an exemplary embodiment.

For example, according to the data shown in FIGS. 13 and 14, it can be seen that the amount of time it took for the indoor temperature to be lowered to 28° C. from a state where the outdoor temperature was 35° C. and the indoor temperature was 33° C. was 5 minutes in 2013, but increased to 10 minutes in 2018, and to 15 minutes in 2023. By using such log information collected under the same environmental condition, the trend of change of the air conditioner's (102a) performance (i.e., a decline in the cooling function) can be presented to the user in an easily understandable form.

Figure 15:
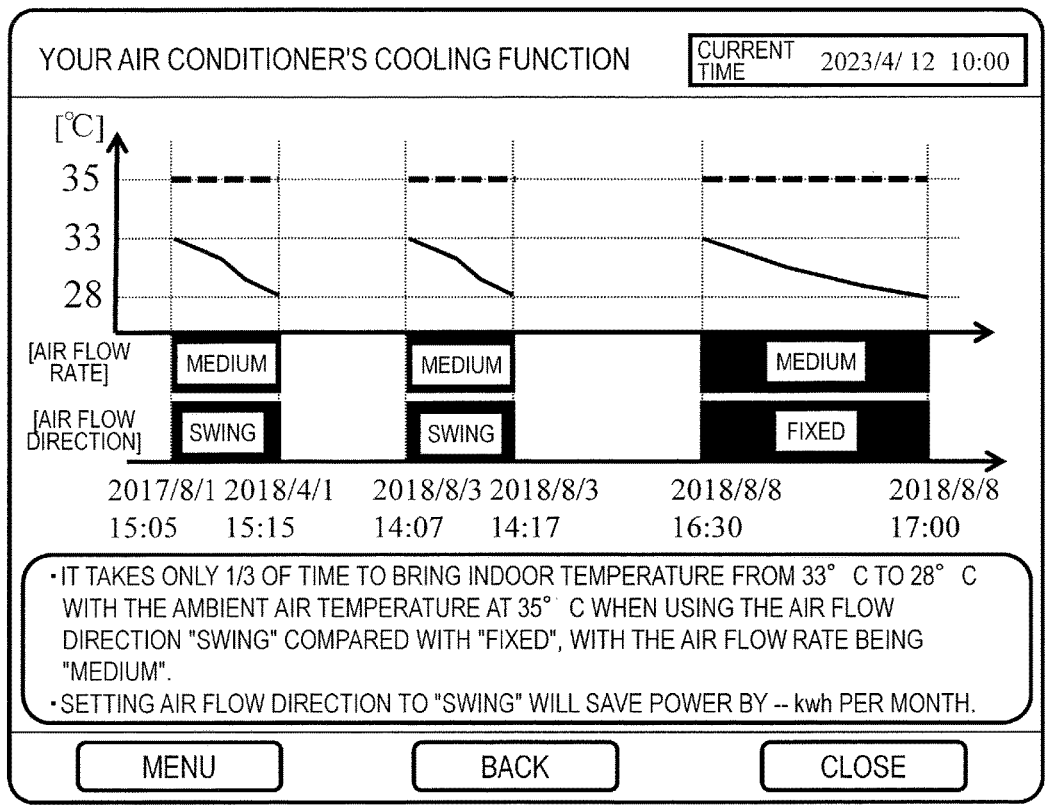
FIG. 15 Illustrates UI Sample #3 of the air conditioner's operation logs to be presented on the display terminal according to an exemplary embodiment.
Figure 16:
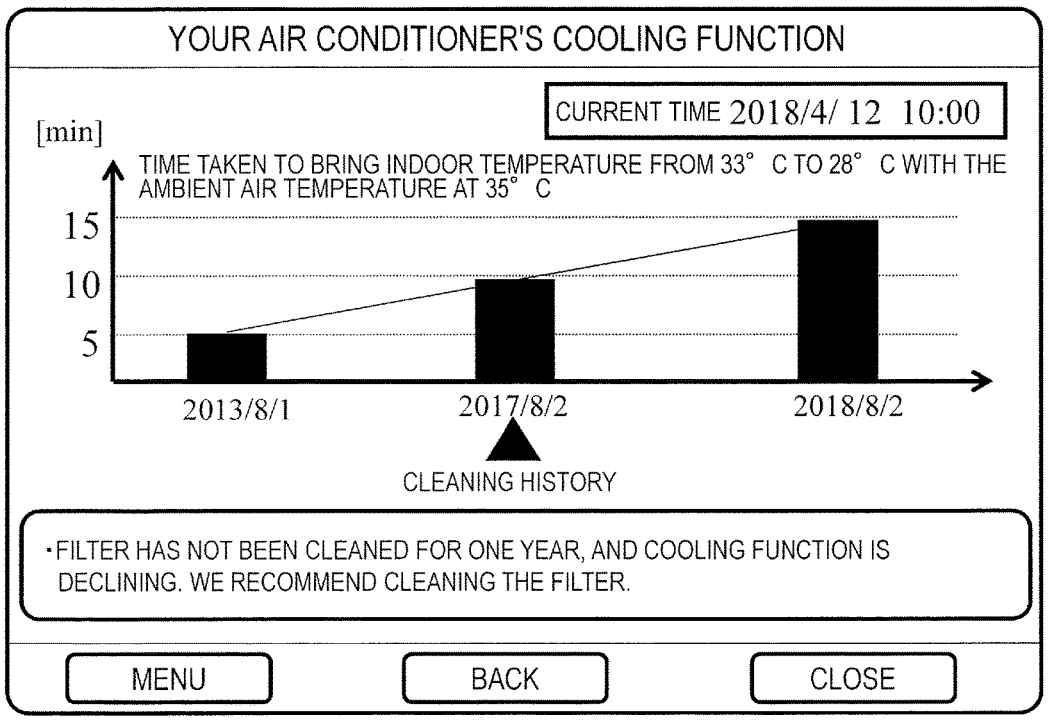
FIG. 16 Illustrates UI Sample #4 of the air conditioner's operation logs to be presented on the display terminal according to an exemplary embodiment.

As shown in FIG. 15, the user may be notified that the power consumption can be reduced by using a certain air flow rate and by setting or not setting the air flow direction to "swing". The user may be notified of a decline in the cooling function based on the cleaning history of the filter 220 as shown in FIG. 16.

According to this embodiment, the management server 20 includes an analysis result storage DB 410 which can be used to manage information about the air conditioner's defects on a lot-by-lot basis as shown in FIG. 11. As a result, User A can be provided with maintenance information associated with the specific defects of another air conditioner which was manufactured in the same lot as the air conditioner 102a he or she uses and in which the turnaround time exceeded the predetermined amount of time. Thus, the user can see, by reference to the product number and manufacturing serial number of the air conditioner 102a, how another product in the same lot as his or hers has deteriorated and caused failures and can determine whether or not his or her air conditioner 102a needs maintenance right now. Considering the fact that that product and his or her own product went through the same manufacturing process, his or her own air conditioner is highly likely to cause similar defects to those of another air conditioner in the same lot. Consequently, the user can be recommended to take appropriate action by being provided with maintenance information.

Figure 17:
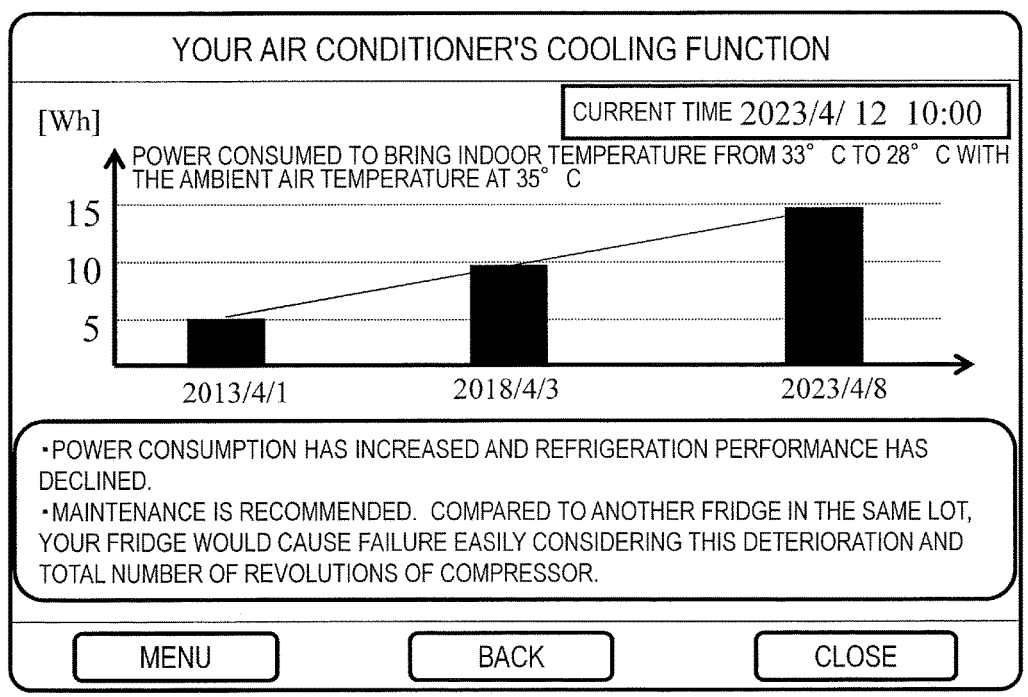
FIG. 17 Shows, using sample data that were collected at three or more points in time, the trend of change of the amount of power consumed before the indoor temperature reached its preset temperature from when the air conditioner started operating in a situation where there was a constant relation between the indoor temperature and the outdoor temperature in an exemplary embodiment.

FIG. 17 shows, using sample data that were collected at three or more points in time, the trend of change in the amount of power consumed before the indoor temperature reaches the preset temperature from when the air conditioner starts operating, in a situation where there is a constant relation between the indoor temperature and the outdoor temperature.

By representing a trend of change using such sample data that were collected under the same environmental condition, it is possible to prevent the accuracy of sensing the signs of an air conditioner's life limit from decreasing. The reason is that since no sample data collected when there was a different relation between the indoor temperature and the outdoor temperature is used, the trend of change hardly varies.

If the amount of time it took until the indoor temperature reaches the target value exceeded a predetermined time (of 11 minutes, for example), then the service information generating section 430e of the management server 20 also provides display data to present maintenance information recommending maintenance of the air conditioner 102a for the mobile telecommunications terminal 130a. User A checks out the service information available that is presented based on the display data provided for the mobile telecommunications terminal 130a. As a result, the user can make a right decision on what to do with his or her own air conditioner 102a without making mistakes. Consequently, it is possible to prevent User A from misunderstanding what the display data means and leaving the air conditioner 102a until the air conditioner 102a has its performance declined too much to operate properly anymore due to a failure.

In this embodiment, the cooling operation has been described above, as an example, with reference to the drawings. However, this is only an example. Also for the heating operation, it is possible to present information about performance deterioration by using such an user interface as described above. This also applies to the dehumidification operation. Where information about performance deterioration regarding the dehumidification function, changes in the humidity in the room my be displayed.

3. Details of Service Providing System According to Embodiment 2

According to the first embodiment described above, a single user is supposed to use the air conditioner 102a continuously. Based on the supposition, it has been described how the turnaround time, or the amount of power consumed, from when the air conditioner starts operating until the indoor temperature reaches the preset temperature in a situation where there is a constant relation between the indoor temperature and the outdoor temperature, changes.

As for this second embodiment, on the other hand, an example in which a plurality of users are supposed to use the same electronic device (the air conditioner 102a) in different periods of time will be described. This may mean that the same air conditioner is put on a second-hand market and used by multiple different persons.

Figure 18:
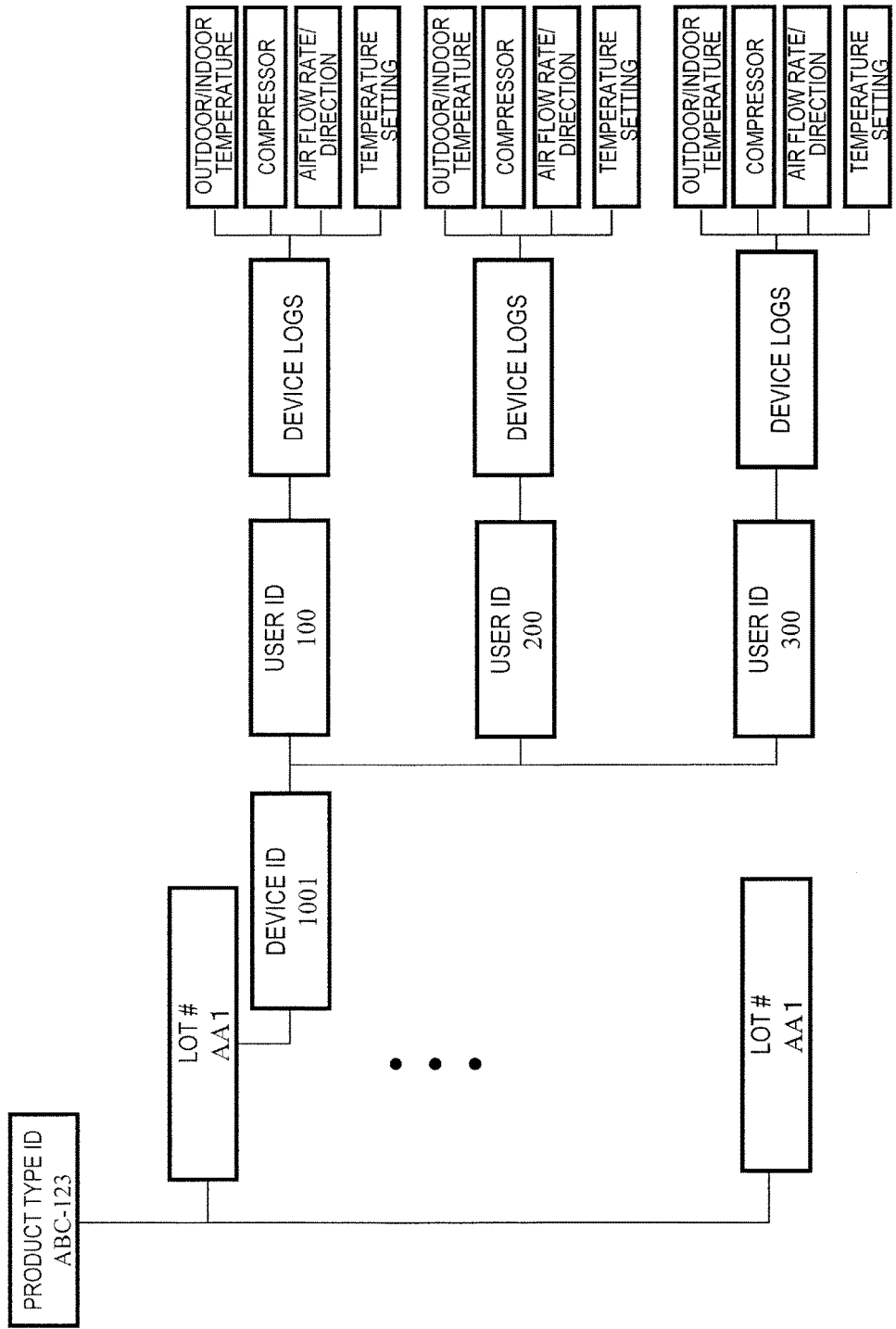
FIG. 18 Illustrates an exemplary configuration #2 for a DB which stores the operation logs of an air conditioner to be managed by a server in an exemplary embodiment.

FIG. 18 shows information about a single air conditioner 102a owned by multiple different persons. As in FIG. 9, the device information DB 440, user registration information DB 450 and log storage DB 400 shown in FIGS. 7 and 8 are used in association with each other.

However, it can be seen that the air conditioner with the device ID "1001" has been owned by three different persons with the user IDs "100", "200" and "300", respectively. And its current owner is supposed to be a person whose user ID is "300", for example.

While the air conditioner was used by those three different persons whose user IDs are "100", "200" and "300", the log information was accumulated in the log storage DB 400 in association with those users.

Figure 19:
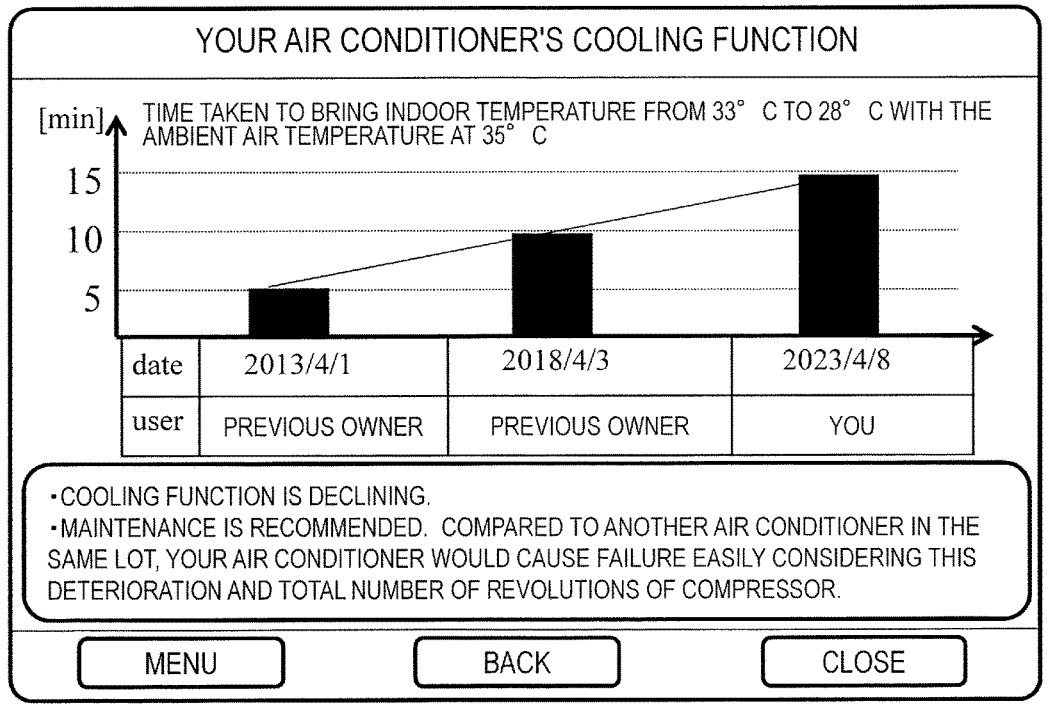
FIG. 19 Illustrates UI Sample #5 of the air conditioner's operation logs to be presented on the display terminal according to an exemplary embodiment.

FIG. 19 shows an example of an air conditioner's performance indicator information to be presented on the mobile telecommunications terminal 130a. As in FIG. 14, also shown in FIG. 19 is the amount of time it took for the indoor temperature to be lowered to 28° C. from a state where the outdoor temperature was 35° C. and the indoor temperature was 33° C. In FIG. 19, however, additional information about its owners is shown along with the periods of use, which is a difference from FIG. 14. It should be noted that the previous users are just called "previous owners" lest they should be identified by their names.

Figure 20:
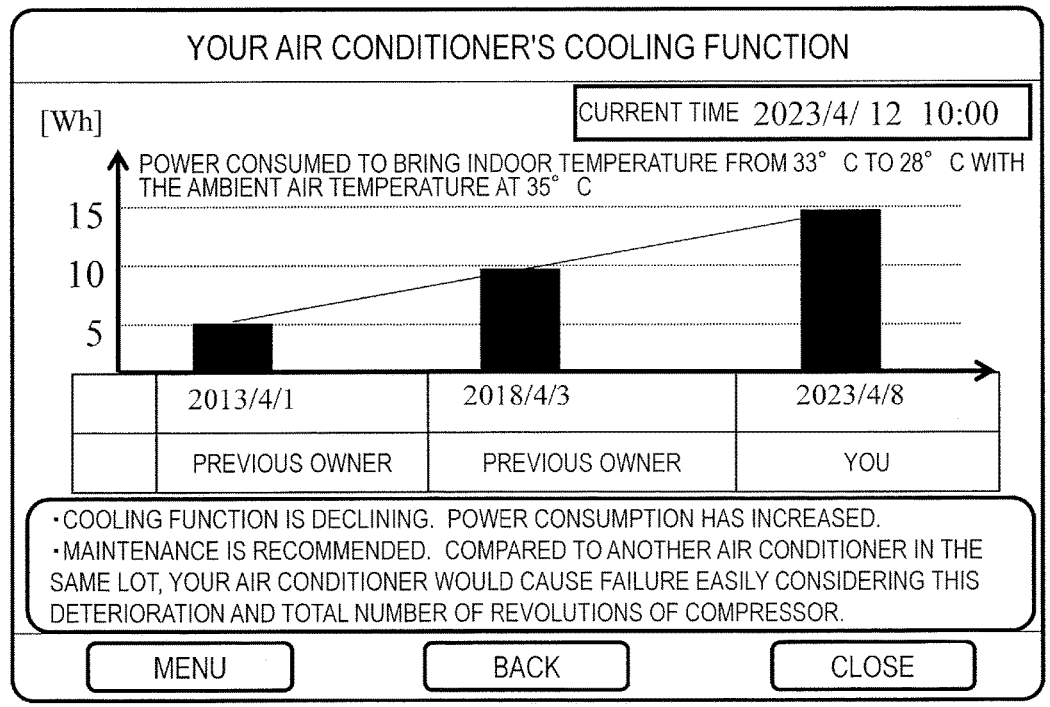
FIG. 20 Shows the trend of change of power consumption along with information about previous users.

FIG. 20 shows how the power consumption increased along with information about the previous users. What is shown in FIG. 20 is quite the same as what is shown in FIG. 17 except that information about the owners is shown as additional information along with the periods of use.

4. Types of Cloud Services to Implement Service Providing System

The technology that has been described for the embodiments may be implemented as the following types of cloud services. It should be noted that these types of cloud services are just examples and there can be other types of cloud services as well.

4.1. Service Type 1: Cloud Service Using In-House Data Center

Figure 21:
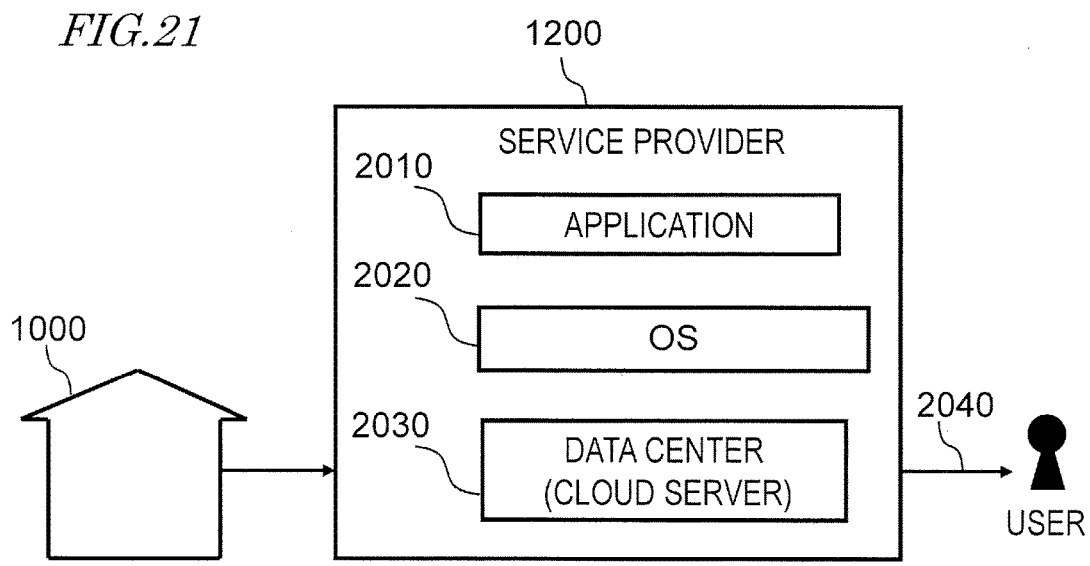
FIG. 21 Outlines the service provided by a system which uses Service Type 1 (cloud service using in-house data center).

FIG. 21 outlines the service provided by a service providing system which uses Service Type 1 (cloud service using in-house data center). According to this type, a service provider 1200 collects information from a user group 1000, and provides services for the user. According to this type, the service provider 1200 functions as a data center operating company. That is to say, the service provider 1200 owns a cloud server 1110 which manages big data. Thus, there is no data center operating company.

According to this type, the service provider 1200 operates and manages the data center (cloud server) 2030, and also manages an operating system (OS) 2020 and an application 2010. And the service provider 1200 provides services using the OS 2020 and application 2010 that are managed by the service provider 1200 by itself (as indicated by the arrow 2040).

4.2. Service Type 2: Cloud Service Using IaaS

Figure 22:
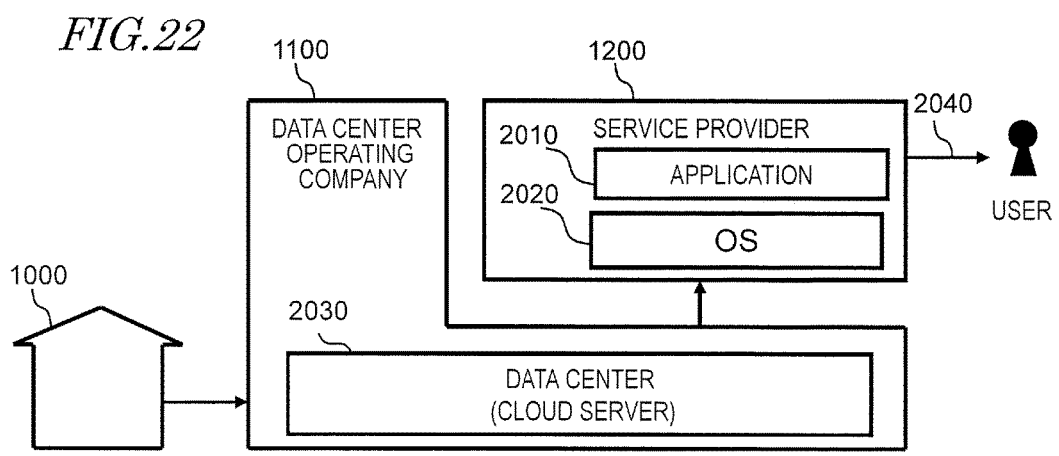
FIG. 22 Outlines the services provided by a system of Service Type 2 (cloud service using IaaS).

FIG. 22 outlines the services provided by a service providing system of Service Type 2 (cloud service using IaaS). In this description, IaaS stands for Infrastructure as a Service, and is a cloud service providing model which provides the basis of establishing and operating a computer system as an Internet-based service.

According to this type, the data center operating company 1100 operates and manages the data center (cloud server) 2030. Meanwhile, the service provider 1200 manages an OS 2020 and an application 2010. And the service provider 1200 provides services using the OS 2020 and application 2010 that are managed by the service provider 1200 by itself (as indicated by the arrow 2040).

4.3. Service Type 3: Cloud Service Using PaaS

Figure 23:
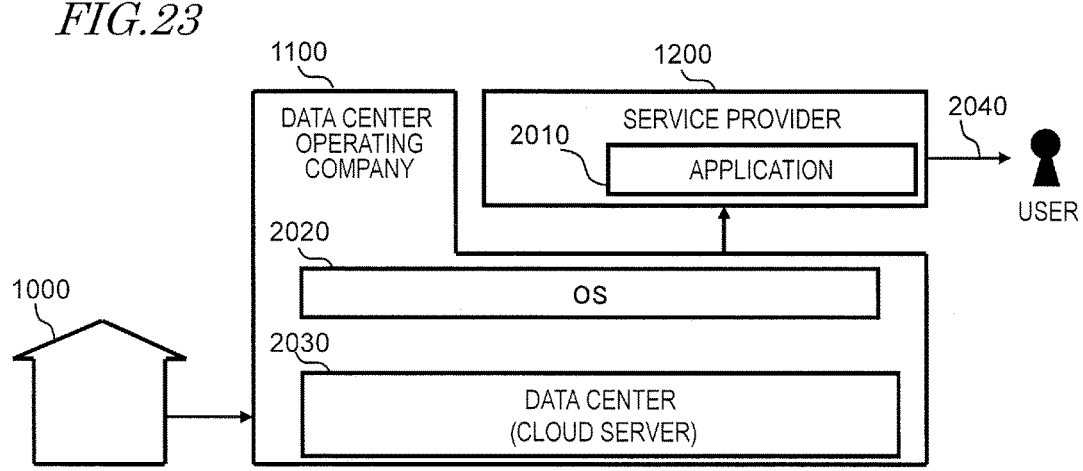
FIG. 23 Outlines the services provided by a system of Service Type 3 (cloud service using PaaS).

FIG. 23 outlines the services provided by a service providing system of Service Type 3 (cloud service using PaaS). In this description, PaaS stands for Platform as a Service, and is a cloud service providing model which provides a platform to be the basis of establishing and running software as an Internet-based service.

According to this type, the data center operating company 1100 manages the OS 2020, and operates and manages the data center (cloud server) 2030. Meanwhile, the service provider 1200 manages an application 2010. And the service provider 1200 provides services using the OS 2020 managed by the data center operating company 1100 and the application 2010 managed by the service provider 1200 itself (as indicated by the arrow 2040).

4.4. Service Type 4: Cloud Service Using SaaS

Figure 24:
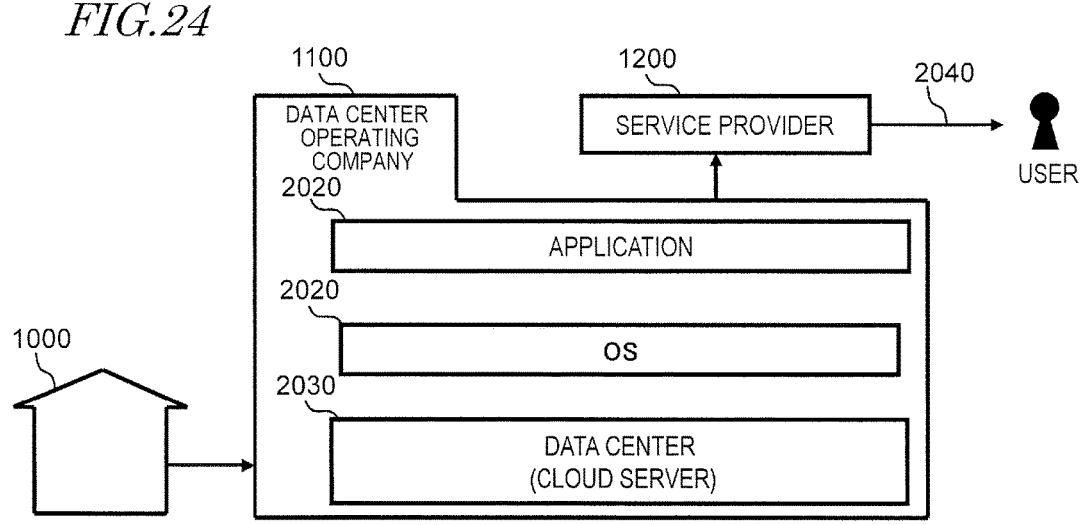
FIG. 24 Outlines the services provided by a system of Service Type 4 (cloud service using SaaS).

FIG. 24 outlines the services provided by a service providing system of Service Type 4 (cloud service using SaaS). In this description, SaaS stands for Software as a Service, and is a cloud service providing model which has the function of allowing a user such as a company or a person who owns no data center (cloud server) to use, through a network such as the Internet, an application provided by a platform provider who owns a data center (cloud server), for example.

According to this type, the data center operating company 1100 manages the application 2010 and the OS 2020, and operates and manages the data center (cloud server) 2030. Meanwhile, the service provider 1200 provides services using the OS 2020 and application 2010 managed by the data center operating company 1100 (as indicated by the arrow 2040).

According to any of these types of cloud services, the service provider 1200 provides services. Also, either the service provider or the data center operating company may either develop an OS, an application or a database of big data by themselves or have it developed by a third party.

5. Other Modified Examples

In the example illustrated in FIG. 2 of the accompanying drawings, multiple users' houses and the management server 20 are supposed to be connected together through the network 30 which is a public line. However, this configuration is only an example. For example, the users' houses shown in FIG. 2 may be respective apartments of the same condominium, and the network 30 and management server 20 may be provided within that condominium's site.

The same can be said if multiple air conditioners are installed within the same household and a home LAN is provided. Although the users' houses shown in FIG. 2 each have only one air conditioner, multiple air conditioners may be installed in one household. Since each air conditioner is assigned a unique device ID, it is possible to uniquely identify each air conditioner.

Alternatively, the multiple users' houses shown in FIG. 2 may be replaced with respective guest rooms of the same hotel, because each room of a hotel is usually equipped with an air conditioner. In that case, the network 30 will be a LAN inside the hotel's site. The management server 20 may be provided either inside or outside of the hotel's facilities.

Still alternatively, the multiple users' houses shown in FIG. 2 may be replaced with vehicles, such as cars, trains, ship or airplanes, each having an air conditioner. As for vehicles, temperature information of the outdoor temperature (e.g., on the surface of the housing near the compressor), which may be the value of a temperature sensor, is obtained as log information. With cars, information of the temperature near the radiator may be obtained. It should be noted that the air conditioner 102a provided in a vehicle is an electronic device to be driven with that vehicle's built-in battery.

In each of the examples of hotels and vehicles described above, air conditioners may be used for business, and therefore, an air conditioner that cannot operate properly due to a failure, if any, will cause a vital problem for those who run the business. That is why it is very useful if the user can see the degrees of performance deterioration of the air conditioners.

Also, in the foregoing description of embodiments, the trend of change is supposed to be represented using sample data that were collected at three or more points in time as shown in FIG. 13, for example. Furthermore, the foregoing description says that by representing a trend of change using such sample data that were collected under the same environmental condition, it is possible to prevent the accuracy of sensing the signs of an air conditioner's life limit from decreasing. However, according to the present disclosure, such sample data collected at three or more points in time does not always have to be used. Alternatively, the trend of change may be represented using sample data that were collected at two points in time or sample data that were collected at four or more points in time. It is not always necessary to represent the trend of change by using sample data collected under the same environmental condition, either.

Figure 25:
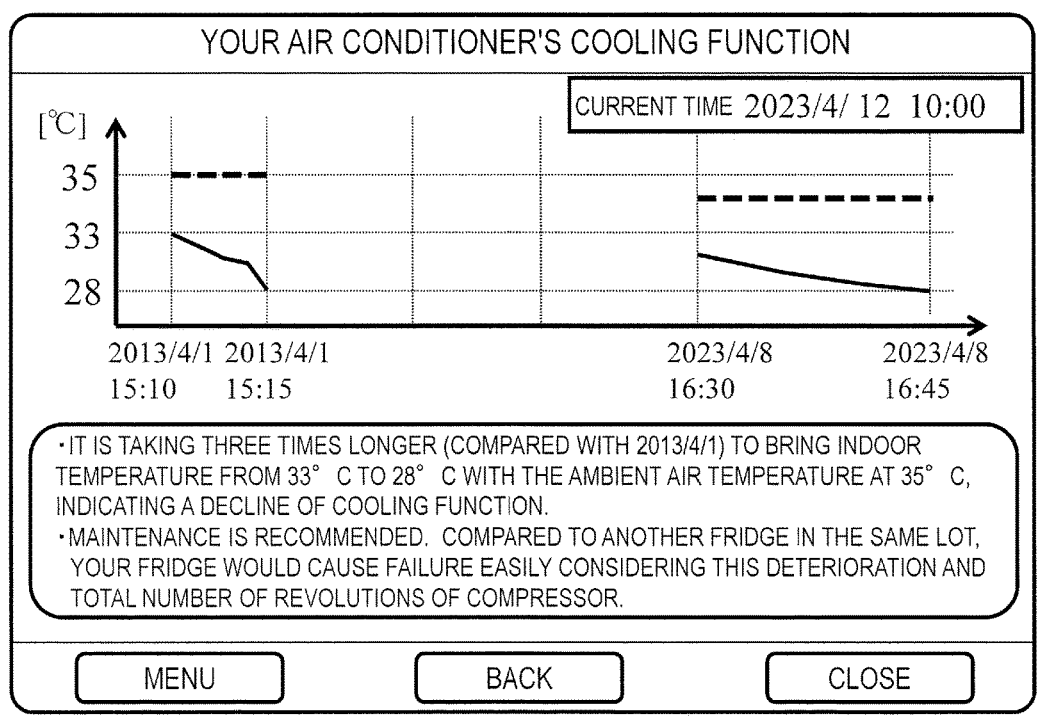
FIG. 25 Shows a trend of change represented by using two sets of sample data.

For example, FIG. 25 shows the trend of change represented by sample data that were collected in two points in time under mutually different environmental conditions. Even so, a decline in the cooling function can also be sensed.

For instance, if the sample data obtained on Apr. 8, 2023 is compared to the sample data obtained on Apr. 1, 2013 in the example shown in FIG. 25, it can be seen that the outdoor temperature has decreased. In lowering the indoor temperature using the compressor 202, the lower the outdoor temperature, the lighter the load on the compressor 202 can be. Nevertheless, it took a lot of time for this air conditioner 102a to lower the indoor temperature, which should be presumably because its cooling function has declined significantly.

Also, in FIG. 25, in the sample data obtained on Apr. 8, 2023, as compared with the sample data obtained on Apr. 1, 2023, the amount of time it took until the inside temperature reached 28° C. from a temperature that was lower than 33° C. was measured. If the sample data obtained on Apr. 8, 2023 is compared to the sample data obtained on Apr. 1, 2013, it can be seen that the indoor temperature needs to be lowered by a smaller amount on Apr. 8, 2023 than on Apr. 1, 2013, and yet it took a longer time to lower the indoor temperature to that target level. Thus, this should also be presumably because its cooling function has declined significantly.

For that reason, sample data collected at three points in time does not have to be used, and the trend of change does not have to be represented by using sample data that was collected under the same environmental condition.

In the foregoing description, in response to a performance indication request received from the mobile telecommunications terminal 130a, the air conditioner's (102a) performance information (service information) is supposed to be transmitted to the mobile telecommunications terminal 130a. However, this operation is only an example. If a predetermined condition indicating that any abnormality such as generation of leakage current or a failure of the compressor 202 has occurred turns out to be satisfied, the service information generating section 430a generates notification data and transmit it to a registered display terminal, no matter whether or not a request has been received from the mobile telecommunications terminal 130a. This is so-called "push transmission".

Furthermore, in the foregoing description, display data to present maintenance information recommending that maintenance be carried out on the air conditioner 102a is supposed to be provided for the mobile telecommunications terminal 130a. However, display data carrying information about a proposed new type of air conditioner may be provided for the mobile telecommunications terminal 130a instead of the maintenance information. The maintenance information is provided on the supposition that the user will continue to use the same air conditioner 102a. Meanwhile, some users may want to buy a new one if his or her current air conditioner 102a needs maintenance. That is why the user may be allowed to decide whether he or she needs the maintenance information or information about a new type of device. Only the information chosen by the user may be presented. Or both the maintenance information and information about a new type of device may be presented to the user who wants to check out both of them.

In the foregoing description, User A is supposed to use the mobile telecommunications terminal 130a at his or her house 10a and receive the analysis results using that terminal. However, the mobile telecommunications terminal 130a is just a means for allowing User A to confirm the analysis results. For example, the telecommunications terminal does not have to be a mobile one. Also, the user may receive and confirm the analysis results using a desktop PC which is not generally used in mobile applications. Furthermore, either a display device provided for the air conditioner 102a or a TV monitor installed at his or her house may also be used instead of the mobile telecommunications terminal 130a to confirm the analysis results.

In the examples described above, a predetermined trend of change such as the turnaround time it takes to recover the preset temperature or power consumption is supposed to be presented on the display screen of the mobile telecommunications terminal 130a. However, presenting such information on the display screen is just a means for presenting the information to the user. Alternatively, instead of, or in addition to, presenting the information on the display screen, an auditory presentation may be made as voice uttered through the loudspeakers (not shown) of the mobile telecommunications terminal 130a. For example, the text data shown in FIGS. 13 to 17, 19, 20 and 25 may be uttered aloud as synthetic human voice. Or the performance variation representing the trend of change may be uttered aloud by reference to the property of the graph.

Also, in the foregoing description, the group of sensors shown in FIGS. 3 to 4 are supposed to be built in the air conditioner 102a. However, this is not an essential requirement. Alternatively, after an air conditioner with no sensors has been installed, the group of sensors, the group of circuits, and the communications circuit 207 (see FIG. 5) may be attached to the air conditioner to perform the processing described above. Such a group of sensors and such a communications circuit 207 (see FIG. 5) may be circulated as products on the market.

INDUSTRIAL APPLICABILITY

The present disclosure can be used effectively when implemented as a service providing system that provides cloud services by reference to the log information of electronic devices (such as air conditioners). In addition, the present disclosure can also be used effectively when the service providing system is providing data for the users.

REFERENCE SIGNS LIST 10a user A's house
10b user B's house
20 management server
30 network
50 service providing system (data processing system)
100a, 100b indoor unit
101a, 101b outdoor unit
102a, 102b air conditioner
110a, 110b gateway (GW)
120a, 120b router
130a, 130b mobile telecommunications terminal
400 log storage database (DB)
410 analyze result storage database (DB)

The invention claimed is:

1. A data providing method to be carried out by a computer built in a data processing system which is designed to collect log information from electronic devices through a network and provide services based on that log information for authenticated users, the method comprising:
   receiving an air conditioner's log information through the network;
   generating display data by reference to pieces of information which are included in the air conditioner's log information and which indicate (i) a preset temperature of the air conditioner, (ii) an outdoor temperature outside a living space in which the air conditioner is installed, and (iii) an indoor temperature of the living space in which the air conditioner is installed, the display data representing a trend of change of a turnaround time that indicates how long it takes from when the air conditioner starts operating until the indoor temperature reaches the preset temperature; and
   providing the display data for an authenticated user's display terminal,
wherein:
   the air conditioner has a filter;
   the display data represents the trend of change of the turnaround time, using sample data that are collected at three or more points in time representing the turnaround time that indicates how long it takes from when the air conditioner starts operating until the indoor temperature reaches the preset temperature of the air conditioner in a situation where the outdoor temperature and the indoor temperature maintain a constant relation;
   the display data includes information about cleaning history of the filter of the air conditioner during a predetermined period of time before the start of operation of the air conditioner wherein the information is associated with a power consumption at each of the three or more points in time; and
   for past points in time from among the three or more points in time, the information about cleaning history represents information when the filter cleaning was done, whereas for a current point in time from among the three or more points in time, the information about cleaning history represents whether the filter cleaning is required at the current point in time.

2. The data providing method according to claim 1, wherein the display data represents the trend of change of the turnaround time using at least three sets of sample data.

3. The data providing method according to claim 1, wherein the display data represents the trend of change of the turnaround time that indicates how long it takes from when the air conditioner starts operating until the indoor temperature reaches the preset temperature in a situation where the outdoor temperature and the indoor temperature maintain a constant relation.

4. The data providing method according to claim 2, wherein each of the at least three sets of sample data is a set of data which has been gotten at the same indoor temperature and at the same outdoor temperature and which is based on the air conditioner's log information.

5. The data providing method according to claim 2, wherein:
   the air conditioner has a filter; and
   the at least three sets of sample data include information about cleaning history of the filter during a predetermined period of time before the start of operation of the air conditioner.

6. A data providing method to be carried out by a computer built in a data processing system which is designed to collect log information from electronic devices through a network and provide services based on that log information for authenticated users, the method comprising:
   receiving an air conditioner's log information through the network;
   generating display data by reference to pieces of information which are included in the air conditioner's log information and which indicate (i) a preset temperature of the air conditioner, (ii) an outdoor temperature outside a living space in which the air conditioner is installed, and (iii) an indoor temperature of the living space in which the air conditioner is installed, the display data representing a trend of change of a turnaround time that indicates how long it takes from when the air conditioner starts operating until the indoor temperature reaches the preset temperature;
   providing the display data for an authenticated user's display terminal; and
   if the turnaround time has exceeded a predetermined amount of time, further providing maintenance information about the air conditioner's maintenance for the display terminal,
wherein:
   the air conditioner has a filter;
   the display data represents the trend of change of the turnaround time, using sample data that are collected at three or more points in time representing the turnaround time that indicates how long it takes from when the air conditioner starts operating until the indoor temperature reaches the preset temperature of the air conditioner in a situation where the outdoor temperature and the indoor temperature maintain a constant relation;

the display data includes information about cleaning history of the filter of the air conditioner during a predetermined period of time before the start of operation of the air conditioner wherein the information is associated with a power consumption at each of the three or more points in time;

for past points in time from among the three or more points in time, the information about cleaning history represents information when the filter cleaning was done, whereas for a current point in time from among the three or more points in time, the information about cleaning history represents whether the filter cleaning is required at the current point in time; and the maintenance information includes a message about the filter cleaning if the turnaround time has exceeded a predetermined amount of time and if the cleaning history indicates that the filter has not been cleaned for the predetermined period of time before the start of operation of the air conditioner.

7. The data providing method according to claim 6, wherein:
the air conditioner has a filter;
the display data includes information about cleaning history of the filter during a predetermined period of time before the start of operation of the air conditioner; and
the maintenance information includes a message about the filter cleaning.

8. The data providing method according to claim 6, wherein:
the air conditioner has a filter;
the display data includes information about cleaning history of the filter during a predetermined period of time before the start of operation of the air conditioner; and
the maintenance information includes a message about the filter cleaning if the turnaround time has exceeded a predetermined amount of time and if the information about cleaning history indicates that the filter has not been cleaned for the predetermined period of time before the start of operation of the air conditioner.

9. The data providing method according to claim 6, wherein if the turnaround time is increasing compared to past history included in the air conditioner's log information and if the turnaround time has exceeded the predetermined amount of time, the maintenance information is further provided for the display terminal.

10. The data providing method according to claim 9, comprising:
finding at least one more air conditioner which has been manufactured in the same lot as the air conditioner by reference to a database in which information about air conditioners' defects is accumulated on a lot-by-lot basis;
further spotting another air conditioner, in which the turnaround time exceeds the predetermined amount of time, from the at least one more air conditioner that has been found; and
providing maintenance information associated with information about the defect of that another air conditioner that has been spotted.

11. A data providing method to be carried out by a computer built in a data processing system which is designed to collect log information from electronic devices through a network and provide services based on that log information for authenticated users, the method comprising:
receiving an air conditioner's log information through the network;
generating display data by reference to pieces of information which are included in the air conditioner's log information and which indicate (i) a preset temperature of the air conditioner, (ii) an outdoor temperature outside a living space in which the air conditioner is installed, and (iii) an indoor temperature of the living space in which the air conditioner is installed, the display data representing a trend of change of the amount of power consumed before the indoor temperature reaches the preset temperature from when the air conditioner starts operating; and
providing the display data for an authenticated user's display terminal,
wherein:
the air conditioner has a filter;
the display data represents the trend of change of the turnaround time, using sample data that are collected at three or more points in time representing the turnaround time that indicates how long it takes from when the air conditioner starts operating until the indoor temperature reaches the preset temperature of the air conditioner in a situation where the outdoor temperature and the indoor temperature maintain a constant relation;
the display data includes information about cleaning history of the filter of the air conditioner during a predetermined period of time before the start of operation of the air conditioner wherein the information is associated with a power consumption at each of the three or more points in time; and
for past points in time from among the three or more points in time, the information about cleaning history represents information when the filter cleaning was done, whereas for a current point in time from among the three or more points in time, the information about cleaning history represents whether the filter cleaning is required at the current point in time.

12. The data providing method according to claim 11, wherein the display data represents the trend of change of the power consumption using at least three sets of sample data.

13. The data providing method according to claim 11, wherein the display data represents the trend of change of the power consumed before the indoor temperature reaches the preset temperature from when the air conditioner starts operating in a situation where the outdoor temperature and the indoor temperature maintain a constant relation.

14. The data providing method according to claim 12, wherein each of the at least three sets of sample data is a set of data which has been gotten at the same indoor temperature and at the same outdoor temperature and which is based on the air conditioner's log information.

15. The data providing method according to claim 12, wherein:
the air conditioner has a filter; and
the at least three sets of sample data include information about cleaning history of the filter during a predetermined period of time before the start of operation of the air conditioner wherein the information is associated with the power consumption.

16. A data providing method in a system which is designed to collect log information from electronic devices through a network and provide services based on that log information for authenticated users, the method comprising:
- receiving an air conditioner's log information through the network;
- generating display data by reference to pieces of information which are included in the air conditioner's log information and which indicate (i) a preset temperature of the air conditioner, (ii) an outdoor temperature outside a living space in which the air conditioner is installed, and (iii) an indoor temperature of the living space in which the air conditioner is installed, the display data representing a trend of change of the amount of power consumed before the indoor temperature reaches the preset temperature from when the air conditioner starts operating;
- providing the display data for an authenticated user's display terminal; and
- if the power consumption has exceeded a predetermined value, further providing maintenance information about the air conditioner's maintenance for the display terminal, wherein:
- the air conditioner has a filter;
- the display data represents the trend of change of the turnaround time, using sample data that are collected at three or more points in time representing the turnaround time that indicates how long it takes from when the air conditioner starts operating until the indoor temperature reaches the preset temperature of the air conditioner in a situation where the outdoor temperature and the indoor temperature maintain a constant relation;
- the display data includes information about cleaning history of the filter of the air conditioner during a predetermined period of time before the start of operation of the air conditioner wherein the information is associated with a power consumption at each of the three or more points in time;
- for past points in time from among the three or more points in time, the information about cleaning history represents information when the filter cleaning was done, whereas for a current point in time from among the three or more points in time, the information about cleaning history represents whether the filter cleaning is required at the current point in time; and
- the maintenance information includes a message about the filter cleaning if the turnaround time has exceeded a predetermined amount of time and if the information about cleaning history indicates that the filter has not been cleaned for the predetermined period of time before the start of a current operation of the air conditioner.

17. The data providing method according to claim 16, wherein:
- the air conditioner has a filter;
- the display data includes information about cleaning history of the filter during a predetermined period of time before the start of operation of the air conditioner wherein the information is associated with the power consumption; and
- the maintenance information includes a message about the filter cleaning.

18. The data providing method according to claim 16, wherein:
- the air conditioner has a filter;
- the display data includes information about cleaning history of the filter during a predetermined period of time before the start of operation of the air conditioner wherein the information is associated with the power consumption; and
- the maintenance information includes a message about the filter cleaning if the turnaround time has exceeded a predetermined amount of time and if the information about cleaning history indicates that the filter has not been cleaned for the predetermined period of time before the start of operation of the air conditioner.

19. The data providing method according to claim 16, wherein if the turnaround time is increasing compared to past history included in the air conditioner's log information and if the turnaround time has exceeded the predetermined amount of time, the maintenance information is further provided for the display terminal.

20. The data providing method according to claim 19, comprising:
- finding at least one more air conditioner which has been manufactured in the same lot as the air conditioner by reference to a database in which information about air conditioners' defects is accumulated on a lot-by-lot basis;
- further spotting another air conditioner, in which the turnaround time exceeds the predetermined amount of time, from the at least one more air conditioner that has been found; and
- providing maintenance information associated with information about the defect of that another air conditioner that has been spotted.

* * * * *